(12) United States Patent
Evans et al.

(10) Patent No.: US 10,987,596 B2
(45) Date of Patent: Apr. 27, 2021

(54) SPECTATOR AUDIO ANALYSIS IN ONLINE GAMING ENVIRONMENTS

(71) Applicant: Amazon Technologies, Inc., Seattle, WA (US)

(72) Inventors: Ethan Zane Evans, Snoqualmie, WA (US); Michael Martin George, Mercer Island, WA (US); Michael Anthony Frazzini, Seattle, WA (US); Alistair Robert Hirst, Redmond, WA (US); Matthew James Van Gorder, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/415,919

(22) Filed: May 17, 2019

(65) Prior Publication Data
US 2019/0270018 A1    Sep. 5, 2019

Related U.S. Application Data

(63) Continuation of application No. 14/732,582, filed on Jun. 5, 2015, now Pat. No. 10,300,394.

(51) Int. Cl.
*A63F 13/86* (2014.01)
*G06F 3/048* (2013.01)
(Continued)

(52) U.S. Cl.
CPC ............ *A63F 13/86* (2014.09); *A63F 13/215* (2014.09); *A63F 13/79* (2014.09); *G06F 3/048* (2013.01); *G06F 3/16* (2013.01)

(58) Field of Classification Search
None
See application file for complete search history.

(56) References Cited

U.S. PATENT DOCUMENTS

| 5,261,820 A | 11/1993 | Slye et al. |
| 5,395,242 A | 3/1995 | Slye et al. |

(Continued)

FOREIGN PATENT DOCUMENTS

| WO | 1999022364 | 5/1999 |
| WO | 2007098560 | 9/2007 |

(Continued)

OTHER PUBLICATIONS

M.A. Anusuya, et al., "Speech Recognition by Machine: A Review", International Journal of Computer Science and Information Security, 2009, pp. 181-205, vol. 6, No. 3.
(Continued)

*Primary Examiner* — Jason T Yen
(74) *Attorney, Agent, or Firm* — Robert C. Kowert; Kowert, Hood, Munyon, Rankin & Goetzel, P.C.

(57) ABSTRACT

An audio analysis system that may analyze participant audio input in a game spectating environment. The audio analysis system may receive audio input for participants (broadcasters and/or spectators) in a game spectating system. The audio analysis system may analyze the audio input to generate audio analysis information for broadcasts, and provide the information to the game spectating system. The audio analysis information may be applied in the game spectating system in various ways. For example, the information may be used to determine active or popular broadcasts, broadcasters, games, and/or recordings of broadcasts, and the active or popular content may be indicated to spectators via a game spectating user interface. The audio analysis system may provide an application programming interface (API) to receive the audio input and to provide audio analysis information.

20 Claims, 18 Drawing Sheets

(51) Int. Cl.
G06F 3/16 (2006.01)
A63F 13/79 (2014.01)
A63F 13/215 (2014.01)

(56) References Cited

U.S. PATENT DOCUMENTS

| | | | |
|---|---|---|---|
| 5,682,196 | A | 10/1997 | Freeman |
| 6,173,260 | B1 | 1/2001 | Slaney |
| 6,275,806 | B1 | 8/2001 | Pertrushin |
| 7,451,079 | B2 | 11/2008 | Oudeyer |
| 7,606,701 | B2 | 10/2009 | Degani et al. |
| 7,803,052 | B2 | 9/2010 | Multerer et al. |
| 7,940,914 | B2 | 5/2011 | Pertrushin |
| 8,078,470 | B2 | 12/2011 | Levanon et al. |
| 8,096,863 | B2 | 1/2012 | Annunziata |
| 8,308,562 | B2 | 11/2012 | Patton |
| 8,628,424 | B1 | 1/2014 | Kern et al. |
| 2003/0033145 | A1 | 2/2003 | Petrushin |
| 2003/0199316 | A1 | 10/2003 | Miyamoto et al. |
| 2003/0220143 | A1* | 11/2003 | Shteyn ............... A63F 13/792 463/42 |
| 2004/0117815 | A1 | 6/2004 | Kondo et al. |
| 2004/0200337 | A1 | 10/2004 | Abe et al. |
| 2007/0117635 | A1* | 5/2007 | Spanton ............... A63F 13/86 463/43 |
| 2007/0239826 | A1 | 10/2007 | Ducheneaut et al. |
| 2008/0119286 | A1 | 5/2008 | Brunstetter et al. |
| 2008/0125226 | A1* | 5/2008 | Emmerson ........... A63F 13/335 463/42 |
| 2008/0270123 | A1 | 10/2008 | Levanon et al. |
| 2008/0300700 | A1 | 12/2008 | Hammer et al. |
| 2012/0052476 | A1 | 3/2012 | Graesser et al. |
| 2014/0004948 | A1 | 1/2014 | Watkins, Jr. et al. |
| 2014/0004951 | A1* | 1/2014 | Kern ....................... A63F 13/86 463/42 |
| 2014/0171039 | A1 | 6/2014 | Bjontegard |
| 2015/0139610 | A1 | 5/2015 | Syed et al. |
| 2015/0332335 | A1 | 11/2015 | Abraham et al. |
| 2015/0352451 | A1* | 12/2015 | Brenden ............... A63F 13/795 463/31 |

FOREIGN PATENT DOCUMENTS

| | | |
|---|---|---|
| WO | 2014061015 | 4/2014 |
| WO | 2014122416 | 8/2014 |

OTHER PUBLICATIONS

Frank Dellaert, et al., "Recgonizing Emotion in Speech", IEEE, Spoken Language, 1996, pp. 1-4 Proceedings., Fourth International Conference on. vol. 3.
Santosh K. Gaikwad, et al., "A Review on Speech Recognition Technique", International Journal of Computer Applications, Nov. 2010, pp. 16-24, vol. 10, No. 3.
Kiel Mark Gilleade, et al., "Afftective Videogames and Modes of Affectived Gaming: Assist me, Challenge Me, Emote Me", Proceedings of DiGRA 2005 Conference, 2005, pp. 1-7.
Eva Hudlicka, "Affective Game Engines: Motivation and Requirements", Proceeding of the 4th International Conference on Foundations of Digital Games, ACM, Apr. 26-30, 2009, pp. 1-9, Orlando, Florida, USA.
Christian Martyn Jones, et al., "Creating an emotionally reactive computer game responding to affective cues in speech", HCI Proceedings, 2005, pp. 1-2, vol. 2.
Paul P.A.B. Merkx, et al., "Inducing and Measuring Emotion through a Multiplayer First-Person Shooter Computer Game", Proceedings of the Computer Games Workshop, 2007, pp. 1-12.
Alan Murphy, Dr. Sam Redfern. "Utilizing Bimodal Emotion Recognition for Adaptive Artificial Intelligence." International Journal of Engineering Science and Innovative Technology (IJESIT), Jul. 2013, pp. 167-173, vol. 2, Issue 4.
Bjorn Schuller, et al., "Acoustic Emotion Recognition: A Benchmark Comparison of Performances", IEEE, ASRU 2009, pp. 552-557.
Norman Makoto Su, et al., "Virtual Spectating: Hearing Beyond the Video Arcade", Proceedings of the 25th BCS conference on human-computer interaction. British Computer Society, 2011, pp. 269-278.
Thurid Vogt, et al., "Automatic Recognition of Emotions from Speech: A Review of the Literature and Recommendations for Practical Realisation", . Affect and emotion in HCI, LNCS 4868, Springer Berlin Heidelberg, 2008, pp. 75-91.
Greg Wadley, et al., "Towards a Framework for Designing Speech-Based Player Interaction in Multiplayer Online Games", Proceedings of the second Australasian conference on Interactive entertainment. Creativity & Cognition Studios Press, 2005, pp. 1-4.
U.S. Appl. No. 14/732,580, filed Jun. 5, 2015, Ethan Zane Evans, et al.
U.S. Appl. No. 14/975,378, filed Dec. 18, 2015, Michael Martin George, et al.
Wang, Jinjun, et al., "Sports highlight detection from keyword sequences using HMM", Multimedia and Expo, 2004, ICME'04, IEEE International Conference, pp. 1-5, vol. 1.
Ren, et al., "Affective sports highlight detection", 15th European Signal Processing Conference, Sep. 3-7, 2007, pp. 728-732.
Isao Otsuka, et al., "A Highlight Scene Detection and Video Summarization System Using Audio Feature for a Personal Video Recorder", Consumer Electronics, IEEE Transactions on 51.1, Dec. 2005, pp. 112-116.
Changsheng Xu, et al., "Live Sports Even Detection Based on Broadcast Video and Web-casting Text", Proceedings of the 14th annual ACM international conference on Multimedia, ACM, 2006, pp. 221-230.
U.S. Appl. No. 14/754,584, filed Jun. 29, 2015, Michael Anthony Willette, et al.
U.S. Appl. No. 14/754,575, filed Jun. 29, 2015, Michael Anthony Willette, et al.
U.S. Appl. No. 14/755,922, filed Jun. 30, 2015, David Hendrik Verfaillie et al.
U.S. Appl. No. 14/755,905, filed Jun. 30, 2015, Michael Anthony Willette et al.
U.S. Appl. No. 14/755,955, filed Jun. 30, 2015, Christopher Paul Dury et al.
U.S. Appl. No. 14/755,944, filed Jun. 30, 2015, Robert Harvey Oates.
U.S. Appl. No. 14/755,934, filed Jun. 30, 2015, Rohit Garg et al.
U.S. Appl. No. 14/755,967, filed Jun. 30, 2015, Patrick Gilmore et al.
U.S. Appl. No. 14/755,974, filed Jun. 30, 2015, Hok Pen Leung et al.
U.S. Appl. No. 14/318,093, filed Jun. 27, 2014, Michael Martin George.
U.S. Appl. No. 14/318,083, filed Jun. 27, 2014, Michael Martin George.
U.S. Appl. No. 14/318,117, filed Jun. 27, 2014, Michael Martin George.
U.S. Appl. No. 14/318,042, filed Jun. 27, 2014, Gerald Joseph Heinz et al.
Mehdi Kaytoue, et al. "Watch me playing, I am a professional: a first study on video game live streaming", Proceedings of the 21st international conference companion on World Wide Web, ACM, 2012, pp. 1-8.
Gifford Cheung, et al., "Starcraft from the stands: understanding the game spectator", Proceedings of the SIGCHI Conference on Human Factors in Computing Systems, ACM, 201, pp. 1-10.
Thomas P. B. Smith, et al."Live-streaming changes the (video) game." Proceedings of the 11th European conference on Interactive TV and video. ACM, 2013, pp. 131-138.
William A. Hamilton, et al., "Streaming on twitch: fostering participatory communities of play within live mixed media." Proceedings of the SIGCHI Conference on Human Factors in Computing Systems. ACM, 2014, pp. 1-10.
Amazon Web Services, "Amazon AppStream Developer Guide", 2014, pp. 1-195.

(56) References Cited

OTHER PUBLICATIONS

Ben Medler, "Generations of Game Analytics, Achievements and High Scores", Eludamos Journal for Computer Game Culture, 2009, pp. 177-194, vol. 3, No. 2.
Wang, Jue, et al. "Interactive video cutout." ACM Transactions on Graphics (TOG). vol. 24. No. 3. ACM, 2005, pp. 585-594.
Smolic, Aljoscha, et al. "3d video and free viewpoint video-technologies, applications and mpeg standards." Multimedia and Expo, 2006 IEEE International Conference on. IEEE, 2006, pp. 1-56.
Karsten Muller, et al. "View synthesis for advanced 3D video systems." EURASIP Journal on Image and Video Processing 2008 (2009), pp. 1-11.
Ballan, Luca, et al. "Unstructured video-based rendering: Interactive exploration of casually captured videos." ACM Transactions on Graphics (TOG) 29.4 (2010): 87, pp. 1-10.
Smolic, Aljoscha, Hideaki Kimata, and Anthony Vetro. "Development of MPEG standards for 3D and free viewpoint video" Optics East 2005. International Society for Optics and Photonics, 2005, pp. 1-13.
Amazon Web Services, "Amazon AppStream Developer Guide", Nov. 13, 2013, pp. 1-200.

\* cited by examiner

SPECTATOR AUDIO ANALYSIS IN ONLINE GAMING ENVIRONMENTS

This application is a continuation of U.S. patent application Ser. No. 14/732,582, filed Jun. 5, 2015, which is hereby incorporated by reference herein in its entirety.

BACKGROUND

Computer-based games have evolved from single-player game programs installed and executed on personal computers or other consumer devices to include technologies that allow multiplayer gaming in which two or more players may simultaneously participate in a game session. For example, game consoles may host console-based games that allow one, two, or more players to simultaneously participate in a game session via controllers connected to the console. As another example, network-based games, which may be referred to as online games, may allow one, two, or more players, in some cases even thousands of players, to simultaneously participate in a game from consumer devices coupled to a network. Evolution of the Internet, Web-based computing, and mobile computing, including the increasingly widespread availability of broadband connections, support for high-resolution video, and the availability and capabilities of consumer computing devices including but not limited to mobile computing devices such as pad/tablet devices and smartphones, has led to continuing evolution and growth of online gaming. Online games may include everything from relatively simple, two-dimensional (2D) casual games to more complex 2D or three-dimensional (3D) action, sports, or strategy games that may involve one or more players in a game session, to multiplayer online battle arena (MOBA) games, to world-building multiplayer games, to complex 3D massively multiplayer online games (MMOGs) such as massively multiplayer online role-playing games (MMORPGs) that may support hundreds or thousands of active players in a persistent online "world".

The continued evolution and growth of online gaming has in turn led to the rise in popularity of video game spectating, or virtual spectating. In virtual spectating, one or more spectators may watch the game play of one or more other players participating in an online game without themselves participating as players in the game play. At least some online games may provide a "spectator" or "observer" mode that allows spectators to watch game play without directly participating in the game. For example, in a multiplayer online game, spectators may watch one or more players or teams of players involved in a battle or otherwise participating in game play. In addition, broadband Internet, high-resolution video, and video streaming technologies have led to the development of live broadcasting technologies that may be leveraged to provide virtual spectating for online games. For example, a game spectating system may allow players to broadcast live or recorded streams of their game play to tens, hundreds, or thousands of spectators, while allowing the spectators to select the live or recorded broadcasts of particular players for viewing.

Figure 1:
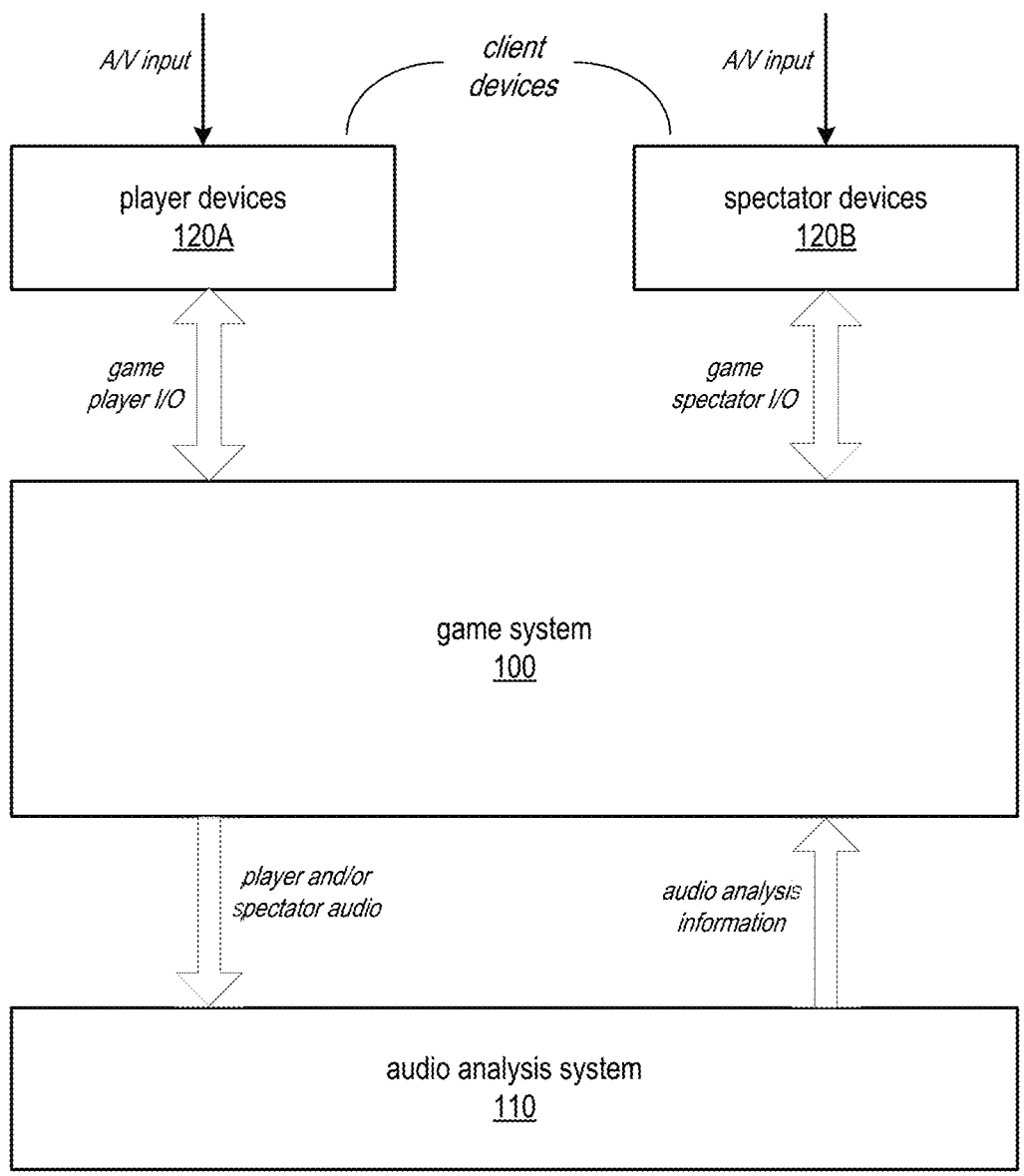
FIG. 1 is a high-level block diagram that illustrates providing analysis of player and/or spectator audio in an online game system, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for analyzing and applying audio input from participants in online gaming environments are described. Online games and game spectating systems may support audio (voice or speech) input/output and communications for game players and/or for game spectators. For example, a player in an online game may communicate commands, suggestions, comments, strategy, chat, or other information to other players within the game via audio input to a respective computing device. As another example, a broadcaster may provide vocal commentary to spectators via an audio channel of a game spectating system. As another example, spectators in an online game system may provide cheers, comments, or other audio input to an online game, or spectators in a game spectating system may provide cheers, comment, chat, or other audio input for broadcasts via audio input channels to the game spectating system. Aggregated participants' (player and/or spectator) audio signals may be used to provide background chatter or "crowd noise" for an online game or broadcast. The participants' audio input signals may be captured by audiovisual (A/V) input components on the participants' respective client devices, digitized, and transmitted over a network to the online game or spectating system. At the online game or spectating system, at least some of the participants' audio signals may be aggregated, processed, and transmitted to the players' and/or spectators' client devices for output as game or broadcast audio.

Embodiments of audio analysis methods and systems are described that may process and analyze the various audio inputs from players, broadcasters, and/or spectators in online gaming environments and apply the analysis information to affect game play and/or game spectating in various ways. Embodiments of an audio analysis module or system are described that may, for example, be used with online games to process and apply audio input from players and/or spectators of the online game to affect play of the online game. In addition, embodiments of an audio analysis module or system are described that may be used in a game spectating system to process and apply audio input from broadcasters and/or spectators in the game spectating system to affect online games and/or the game spectating system.

In some embodiments, game player audio for multiple players (e.g., players in groups or teams) may be analyzed to determine, for example, the current states (e.g., emotions, moods, excitement level, stress level, anger, sadness, happiness, frustration, fear, shock, surprise, amusement, etc.) of the players/groups, and game play may be affected based on the analysis. In some embodiments, game spectator audio for multiple spectators may be analyzed to determine, for example, the states (e.g., emotions, moods, excitement level, stress level, anger, sadness, happiness, frustration, fear, shock, surprise, amusement, etc.) of the spectators or crowd, and game play may be affected based on the analysis. In some embodiments, player and/or spectator audio may be analyzed to determine events or states within one, two or more broadcasts or channels in a game spectating system, and the analysis results may be used to affect the game spectating interface, for example by indicating or highlighting broadcasts or events of interest within broadcasts to the spectators. In some embodiments, player and/or spectator audio may be analyzed to determine interesting or notable events ("highlights") in the broadcasts and/or games executing on the game systems. Highlight segments may be extracted from the broadcasts according to the highlight data; the highlight segments may then be presented to participants via respective participant devices.

Game systems may provide a speech interface via which game players can vocally enter commands to the game engine, for example to control game execution or control the players' in-game characters. For example, a player may speak "pause game" or "end game" commands to control game execution, or may speak commands such as "turn left", "look up", and "open door" to control actions of the player's in-game character. While embodiments of an audio analysis system may analyze vocal inputs to a game system's speech interface to detect states (emotion, mood, excitement etc.) of the players, the audio analysis system does not itself act as a speech interface to the game engine to interpret and execute vocal commands to the game engine.

In at least some embodiments, an audio analysis module or system may include, but is not limited to, an emotion recognition component and a speech recognition component. The emotion recognition component may receive and analyze voice input from participants, for example using one or more signal analysis techniques, to determine emotions or emotional states (e.g., excitement, stress, fear, shock, surprise, amusement, anger, sadness, happiness, frustration, etc.) for participants or groups of participants from the participants' vocal patterns. The identified emotions or states may then be applied to determine information about and affect a game or broadcast in various ways as described herein. The speech recognition component may receive and analyze voice input from participants to detect and extract speech for participants, may recognize speech patterns that identify particular participants, and may extract words and/or phrases that may be applied to determine information about and affect a game or broadcast in various ways as described herein.

Online games are network-based games that may allow one, two, or more players, in some cases even thousands of players, to simultaneously participate in a game from consumer devices coupled to a network. At least some online games may provide a "spectator" or "observer" mode that allows spectators to watch game play from consumer devices coupled to the network without directly participating in the game. At least some online games may also allow game sessions to be recorded and played back for viewing by the players and/or spectators.

Online games that may be implemented in online gaming environments as described herein may vary from tightly scripted games to games that introduce varying amounts of randomness to the game play. An online game may, for example, be a game in which the players attempt to achieve some goal or overcome some obstacle, and may include multiple levels that the players have to overcome. An online game may, for example, be a game in which the players cooperate to achieve goals or overcome obstacles, or a game in which one or more of the players compete against one or more other players, either as teams or as individuals. Alternatively, an online game may be a game in which the players may more passively explore and make discoveries within a complex game universe without any particular goals in mind, or a "world-building" online game in which the players may actively modify their environments within the game universe. Online games may include everything from relatively simple, two-dimensional (2D) casual games to more complex 2D or three-dimensional (3D) action, sports, or strategy games, to multiplayer online battle arena (MOBA) games, to complex 3D massively multiplayer online games (MMOGs) such as massively multiplayer online role-playing games (MMORPGs) that may simultaneously support hundreds or thousands of players in a persistent online "world".

Game spectating systems may include network-based video streaming systems that may allow players to broadcast live streams of their online game play to tens, hundreds, thousands or more spectators, while allowing the spectators to select the broadcasts of particular players (also referred to as channels) for viewing. A game spectating system may support live streaming of broadcasts from tens, hundreds, or thousands of players simultaneously. A game spectating system may record at least some live broadcasts and allow the recorded broadcasts to be played back for viewing by spectators. A game spectating system may support live and recorded broadcasts for one, two, or more different online games.

In this document, the term "player" is generally used to refer to an actual human that actively participates in an online game, the term "spectator" is generally used to refer to an actual human that watches live or recorded game play online without directly participating in the game as a player, the term "participant" is generally used to collectively refer to players (active participants) and spectators (passive participants), the term "client" (as in "client device", "game client", "broadcasting client", and "spectating client") is generally used to refer to a hardware and/or software interface to a game system or streaming system via which a participant interacts with the game system and/or spectating system, and the term "character" or "game character" is generally used to refer to a player's in-game presence or "avatar" that the player may control via a game client on a client device to interact with other game characters, other game entities, and other objects within the game environment during a game session.

While embodiments are primarily described herein in the context of analyzing and applying audio input in multiplayer online gaming environments in which two or more players remotely participate in online game sessions, it is to be noted that embodiments may also be applied in single-player online games, as well as in single-player and multiplayer games that are not necessarily online, such as single-player and multiplayer console games that may be played locally/offline. In addition, in some embodiments, a spectating system may support broadcasts of live and/or recorded digital media content from sources other than game systems, for example from sports games, competitions, concerts, and other events including but not limited to live streams from electronic spectator sports (eSports) competitions, and embodiments may also be applied to analyze and apply audio input for these broadcasts.

While embodiments are primarily described herein in the context of analyzing and applying audio input in online gaming environments to detect states of participants affect an online game and/or spectating system broadcast, it is to be noted that embodiments may also analyze content of other participant inputs to the online gaming environment, for example text input to an online chat user interface element of an online game or spectating system broadcast, and may use that analysis alone or in combination with the audio analysis to detect states of participants and affect an online game and/or spectating system broadcast as described herein.

In addition, some embodiments may also collect and analyze other data from the participants, and may use that analysis alone or in combination with the analysis of the participant audio and/or textual inputs to detect states of participants and to affect an online game and/or spectating system broadcast as described herein. As an example, some embodiments may obtain and analyze biometric data (e.g., pulse, heartrate, perspiration, etc.) for participants, for example from wearable devices that collect biometrics, and that analysis may be used alone or in combination with analysis of other inputs such as audio inputs to determine states of participants and affect an online game and/or spectating system broadcast as described herein As another example, some embodiments may obtain images of participants' faces (broadcasters, players, commentators and/or spectators) captured during game play or broadcast, for example images captured by cameras attached to or integrated with the participants' respective client devices. The images may be analyzed, for example using facial recognition techniques and techniques that detect emotions via analysis of facial expressions, and that analysis may be used alone or in combination with analysis of other inputs such as audio inputs to determine states of participants and affect an online game and/or spectating system broadcast as described herein.

As another example, some embodiments may obtain images of participants' eyes (broadcasters, players, commentators and/or spectators) captured during game play or broadcast, for example images captured by cameras attached to or integrated with wearable computing devices such as smart glasses, goggles, optical head-mounted displays, virtual reality (VR) headsets, and the like. The images may be analyzed, for example using techniques that detect emotions or other states via tracking and analysis of eye movements, blinking, dilation, and so on, and that analysis may be used alone or in combination with analysis of other inputs such as audio inputs to determine states of participants and affect an online game and/or spectating system broadcast as described herein.

Audio Analysis and Application in Online Game Systems

FIG. 1 is a high-level block diagram that illustrates providing analysis of player and/or spectator audio in an online game system, according to at least some embodiments. In some embodiments, an online game system may include a game system 100 and multiple client devices; the client devices may include player devices 120A and spectator devices 120B. The game system 100 stores game data and information, implements game logic, and serves as an execution environment for the online game. Each client device 120 may include, but is not limited to, input and output components and client software for the online game via which respective players can participate in a game session currently being executed by the game system 100, and via which one or more spectators may watch current game sessions or recorded game sessions.

Figure 14:
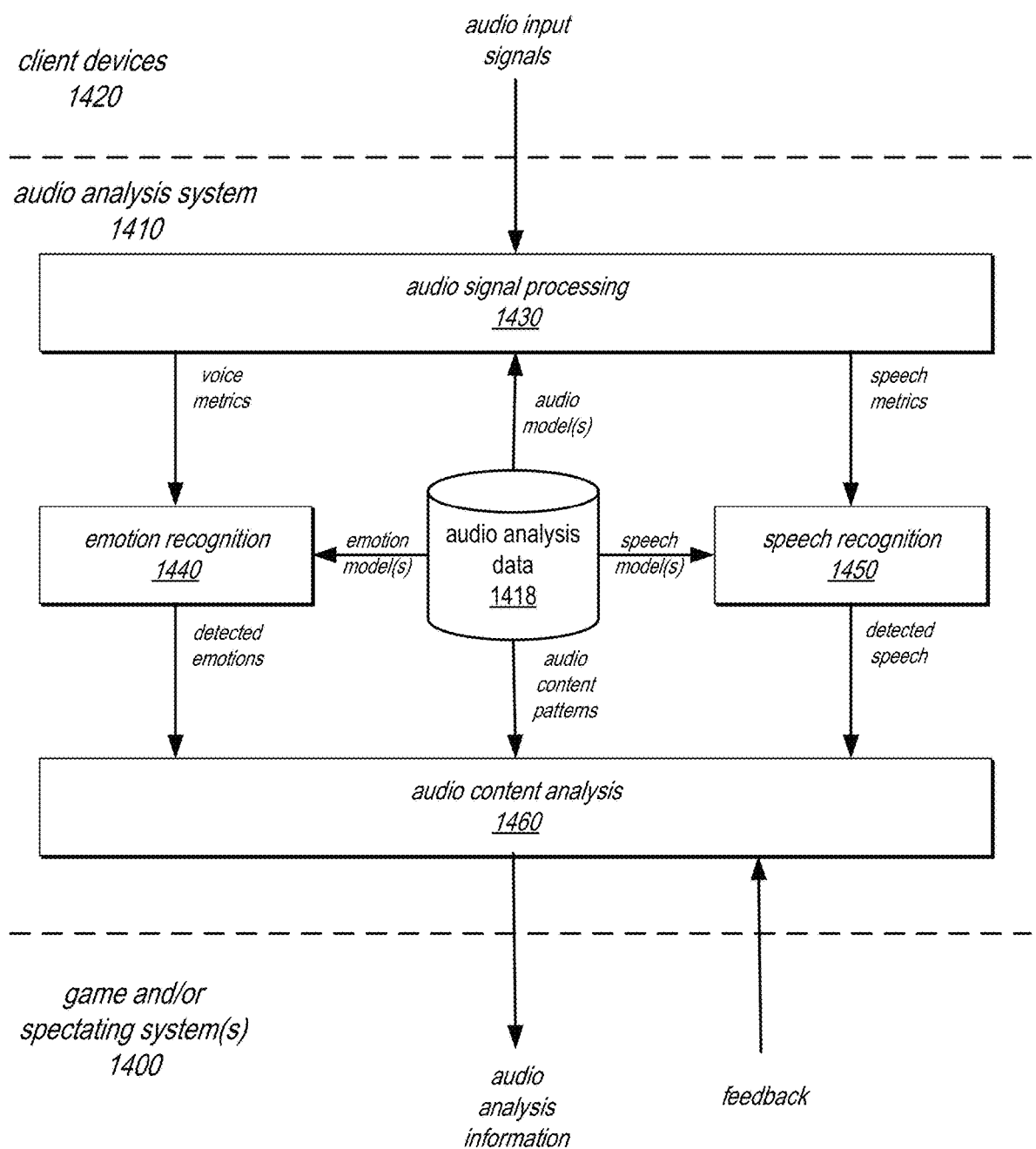
FIG. 14 is a high-level illustration of processing audio signals to generate information in an audio analysis system, according to at least some embodiments.
Figure 15:
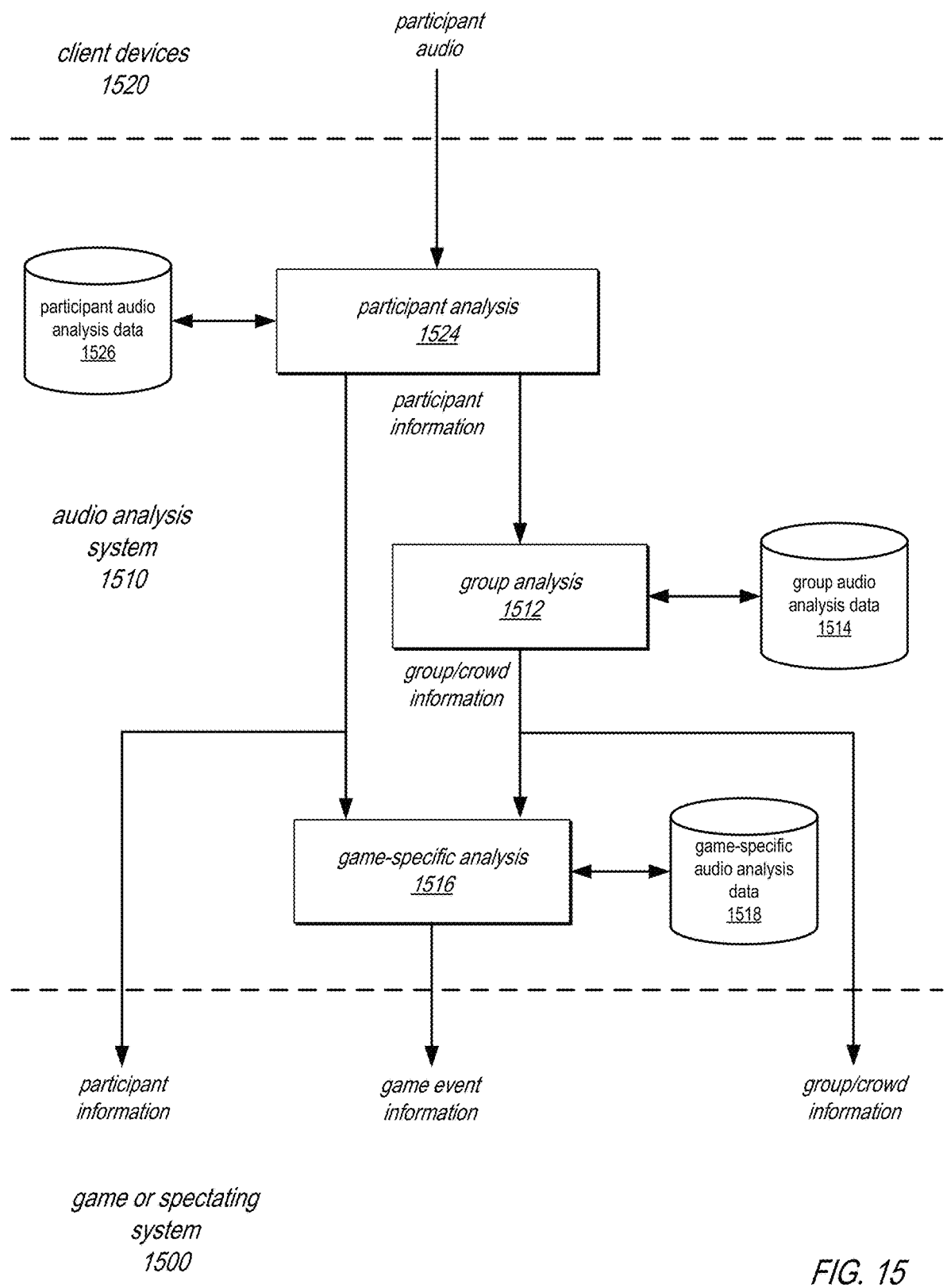
FIG. 15 is a block diagram that illustrates processing participant audio according to audio analysis data in an audio analysis system, according to at least some embodiments.

The online game system may also include an audio analysis module or system 110. In some embodiments, audio analysis system 110 may include one or more computing devices, for example one or more server devices, that implement an audio analysis engine that provides audio analysis functionality and one or more application programming interfaces (APIs) to the audio analysis functionality. Audio analysis system 110 may also include or access other devices including but not limited to storage devices for storing audio analysis information for individual participants (players and/or spectators), groups, crowds, and/or games including but not limited to audio content patterns (emotion and/or speech patterns) that can be matched or mapped to individual participants' states, group or crowd states, particular game events, keywords and key phrases, and so on. In some embodiments, audio analysis system 110 may be implemented as a separate system from game system 100, for example as a network-based service that is accessible by one or more entities including but not limited to game system 100. In some embodiments, audio analysis system 110 may instead be implemented as a component, module, or subsystem of a game system 100. FIGS. 14 and 15 illustrate components and operations of an audio analysis system 110, according to at least some embodiments.

Figure 16:
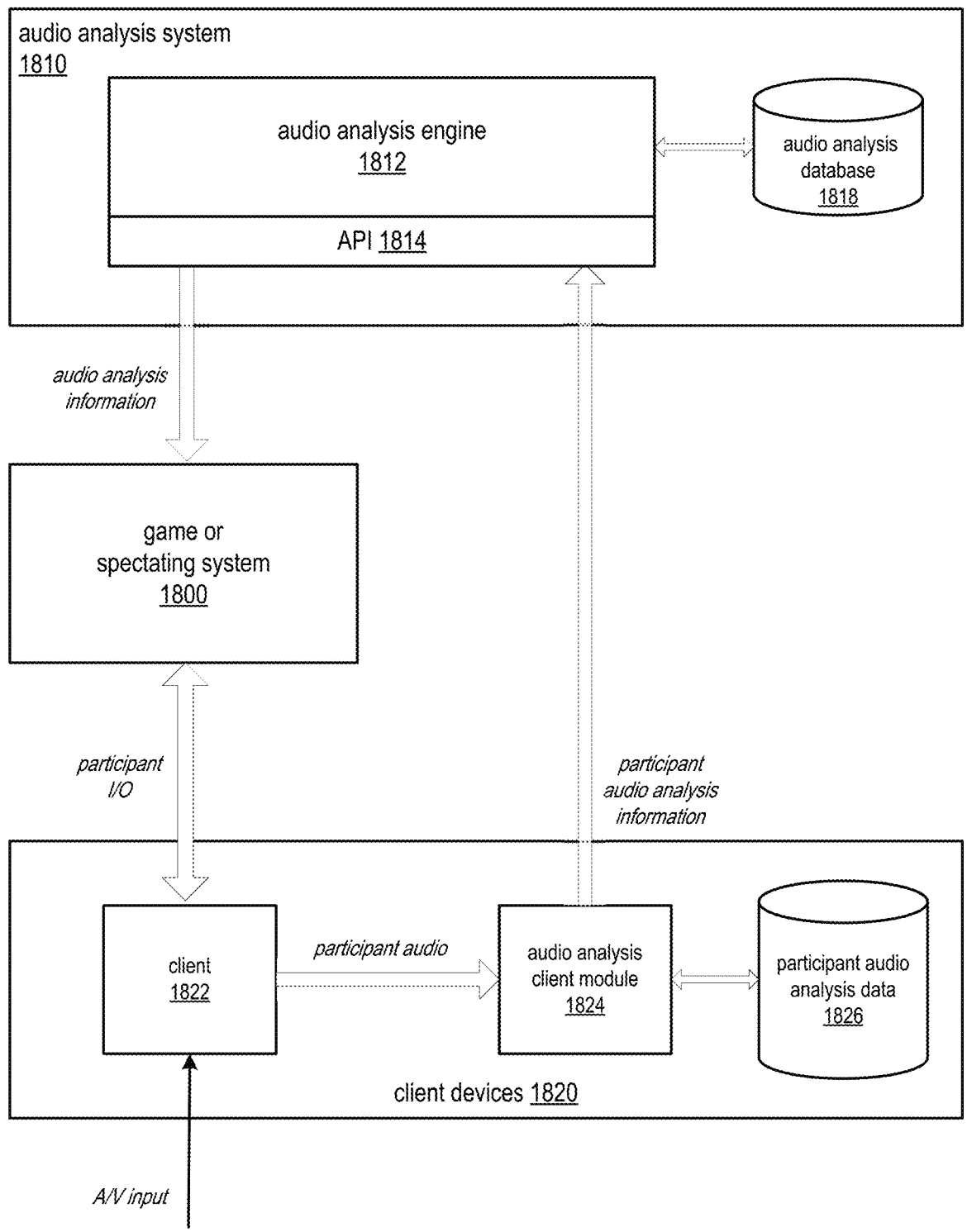
FIG. 16 is a block diagram that illustrates analysis of audio performed at least in part on client devices in an online gaming environment, according to at least some embodiments.

In some embodiments, audio analysis system 110 functionality may be implemented in part on client devices 120. For example, in some embodiments, an audio analysis client module may be installed on at least some client devices 120, may locally perform audio analysis for a participant (player or spectator) associated with the client device 120, and may stream or upload the participant audio analysis information to the game system 100 and/or audio analysis system 110 for aggregation with other audio information and further analysis. FIG. 16 illustrates analysis of audio performed at least in part on client devices in an online gaming environment, according to at least some embodiments.

Figure 2:
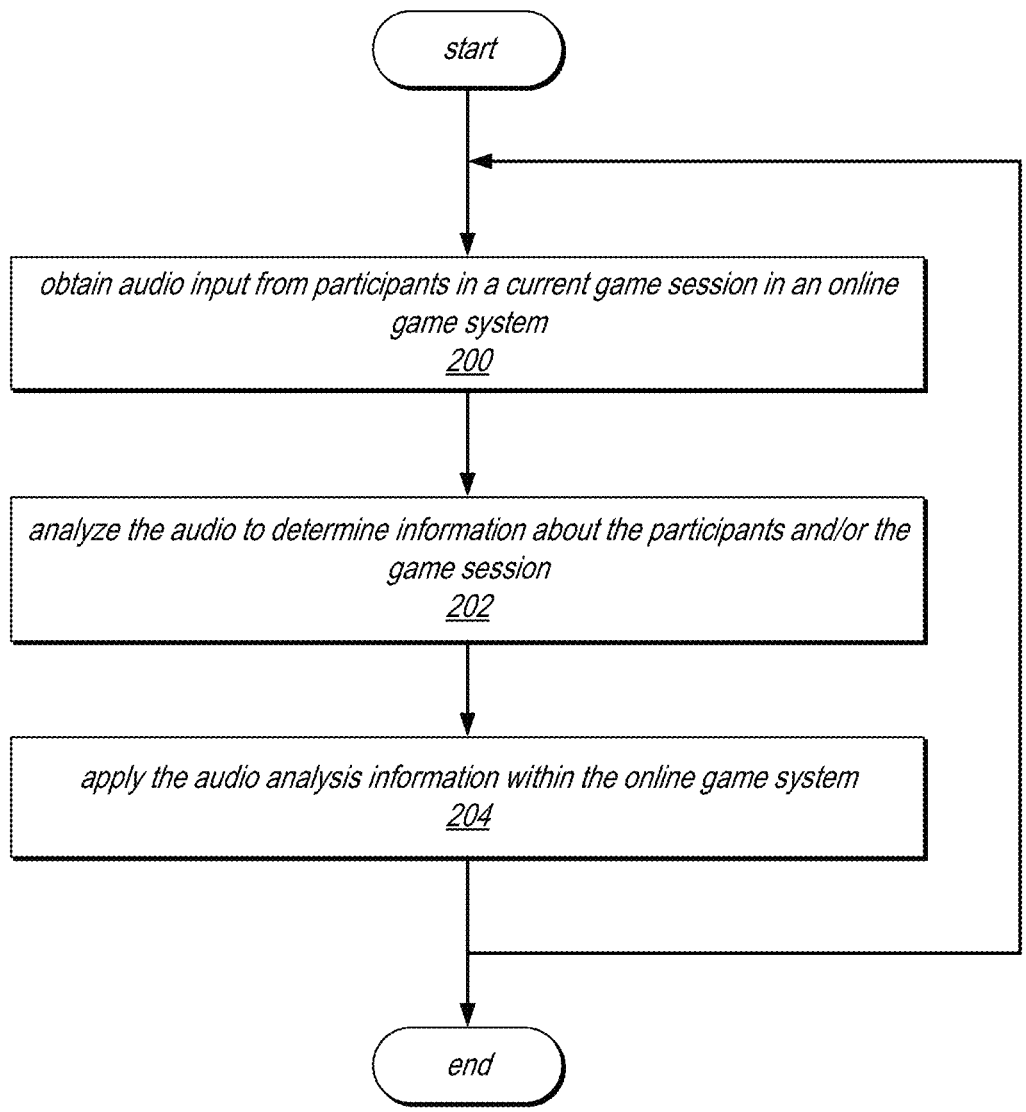
FIG. 2 is a high-level flowchart of a method for analyzing and applying audio input from participants in an online game system, according to at least some embodiments.

FIG. 2 is a high-level flowchart of a method for analyzing and applying audio input from participants in an online game system, according to at least some embodiments. The method of FIG. 2 may, for example, be implemented in online game systems as illustrated in FIG. 1.

As indicated at 200 of FIG. 2, digital audio input may be obtained from participants (players and/or spectators) in a current game session in an online game system, for example a multiplayer online game. Referring to FIG. 1, in some embodiments, client devices 120 may include audiovisual (A/V) components that may receive and digitize audio (e.g., voice or speech) input from game players and/or game spectators during game play and/or game spectating. In some embodiments, game system 100 may receive player audio input from player devices 120A, and may also receive spectator audio input from spectator devices 120B. The digital audio input may, for example, be received by game system 100 as an audio track in video input, as Voice over IP (VoIP), or according to other network formats or protocols.

In some embodiments, metadata may be obtained for the audio input signals. The metadata may, for example, identify respective participants corresponding to the audio input signals, indicate whether a participant is a player or a spectator, and indicate other known information about the participant and/or game session. In some embodiments, at least some of the metadata may be obtained from profile information for participants (spectators and/or players) in the online gaming environment, for example participant profiles maintained by the game system 100. For players, the metadata may, for example, indicate the players' roles or characters within the virtual game universe, the players' affiliations (e.g., groups or teams) in the game session, indicate the current location, orientation, view, status, time (within the game universe or game session timeline) and other information for the player's character within the game session or game universe, and so on. For spectators, the metadata may, for example, uniquely identify the spectator, and may also indicate spectating information such as where, what, and who the spectator is currently viewing within the game universe/game session, team or player affiliations or favorites, spectating history, and so on.

As indicated at 202 of FIG. 2, the digital audio input may be analyzed to determine information about the participants and/or the game session. Referring to FIG. 1, in some embodiments, the game system 100 may provide the received audio input to an audio analysis system 110. The audio analysis system 110 may perform signal analysis, for example time- and frequency-domain analysis, on the audio signals to determine one or more audio signal metrics (voice and/or speech metrics) from the audio signals. The metrics may, for example, include one or more of amplitude, pitch, duration, and frequency metrics, and in general any relevant metric that can be extracted from an audio or voice signal. The audio signal metrics may be analyzed, for example by comparing the metrics to known or learned audio content patterns for individual participants or groups of participants according to one or more emotion recognition and speech recognition techniques, to determine information about the participants and/or the game session.

In some embodiments, the audio signals may be individually analyzed to determine voice and/or speech metrics for each audio input, and the metrics may then be normalized, aggregated, and analyzed to determine information about groups of participants (players and/or spectators). In some embodiments, instead of or in addition to separately analyzing the audio signals and then aggregating the metrics for further analysis, the audio signals may be aggregated or combined and analyzed collectively to generate metrics for and information about groups of participants.

In some embodiments, the metadata obtained for the audio input signals may be used when analyzing the audio input signals to determine information about the spectators and/or players. For example, the metadata may indicate affiliations or team preferences for spectators of a sports game based on the spectators' profile information maintained by the game system 100. The spectator audio signals for a game may be segmented into two or more groups according to the metadata, for example into groups of fans of two opposing teams in a sports game such as football according to the spectators' indicated team affiliations, and analyzed separately according to the groups to determine group-specific information about the current game session. For example, the group-specific information may indicate which group of spectators are currently cheering or booing, which group is the loudest and/or quietest, and so on. Player/broadcaster audio signals may also be segmented into groups (e.g., opposing teams) according to player profile information for player group analysis.

In some embodiments, the determined information may, for example, indicate an emotion or emotional state or states (e.g., excitement, stress, anger, sadness, happiness, frustration, fear, shock, surprise, amusement, etc.) of individual participants (players and/or spectators) based on the analysis of the individual participants' vocalizations or other sounds in the respective audio signals. In some embodiments, the determined information may also indicate other information about individual participants, for example affiliations or preferences of spectators. For example, spectators may be detected to be fans of particular players or teams based on the analysis of the individual participants' vocalizations or other sounds in the respective audio signals. In some embodiments, the determined information may be use to segment participants into two or more groups, for example fans of particular players or teams, based on the analysis of the individual participants' vocalizations or other sounds in the respective audio signals. In some embodiments, the determined information may instead or also indicate a state or states for a group or crowd (e.g., excitement, stress, approval, disapproval, etc.) based on an analysis of the combined audio signal metrics for two or more participants (players and/or spectators). In some embodiments, the information may also indicate a level for a determined state, for example an indication of how excited a crowd of spectators appears to be based on an analysis of aggregated spectator audio input.

In some embodiments, the information may also indicate particular events in an online game session. For example, in some embodiments, at least some of the audio content patterns to which the audio signal metrics are matched may be mapped to particular types of events in the respective online game. For example, in a sports game, particular crowd (spectator) and/or player audio content patterns may be mapped to big plays, such as scoring plays or great defensive plays. In some embodiments, the information may anticipate or predict a potential upcoming event in an online game session. For example, in a sports game, particular crowd (spectator) and/or player audio content patterns may be mapped to what typically happens prior to a particular big event, such as crowd silence or chanting before an important offensive play in a football game, or very low crowd noise before a big defensive play in a football game. In some embodiments, the information may also indicate locations and times within the game universe for particular events to which the analyzed audio signals are mapped. For example, analysis of aggregated spectator or player audio signals and correlated metadata may indicate a particular location or area in the online game universe, and a particular time within the game timeline.

In some embodiments, the information may also indicate other information about individual participants, for example affiliations or preferences of spectators (e.g., fans of particular players or teams). For example, spectators may be detected to be fans of a particular player or team based at least in part on their audible input (cheering, booing, loud, quiet, etc.) at particular times or in response to particular events in a game or broadcast. As another example, spectators may be detected to be fans of a particular player or team based at least in part on particular keywords, phrases, or chants recognized in their speech input to the broadcast. In some embodiments, a spectator's detected affiliations or preferences may be added to their profile information. In some embodiments, the spectator's profile information may be modified over time based upon additional analysis of their audio or other inputs.

As indicated at 204 of FIG. 2, the audio analysis information may be applied within the online game system. In some embodiments, the audio analysis information may be used to provide visual feedback or other feedback to the participants within the game environment, for example by displaying game and/or spectating information for participants via a user interface (UI) to the game system 100 provided by a game client executing on the client devices 120. The following provides several examples of applying audio analysis information within an online game system. However, note that these examples are not intended to be limiting.

As an example of applying audio analysis information within an online game system, in some embodiments, two or more players may be participating as a team, there may be one or more teams, and the audio that is analyzed may include the collaborative in-game voice chat of the players within the team(s). The audio analysis information may indicate an emotion or emotional state (e.g., stress, excitement, calmness, anger, sadness, happiness, frustration, etc.) for a team as a whole, for a collection of two or more teams, and/or for the individual players within the team(s). This information may be displayed or otherwise provided to the team members and/or other players in the game (e.g., players on other teams, players that are controlling or commanding one or more teams, and so on), and may, for example, be used in making game-playing decisions by team members or team commanders. For example, in a battle game, a commander of two or more teams may decide to send a second team into an area that a first team is in based on excitement or stress level detected from the audio signals of the first team.

As another example of applying audio analysis information within an online game system, the audio analysis information may indicate an emotion or emotional state (e.g., stress, excitement, anger, sadness, happiness, frustration, etc.) for one or more of the players, and the players' avatars or online characters as displayed in the game universe may be visually modified, for example using colors, to indicate the respective players' emotions or emotional states. For example, currently stressed or angry players' online characters may be shaded red, while currently calm players' characters are not shaded or are shaded green or blue. As another example, the expression on the faces of the players' online characters may be modified to indicate the detected emotion or emotional state of the respective players. As another example, a visual and/or audio indication of an online character's heartbeat or pulse may be provided to indicate a player's excitement level as detected from analysis of audio input from the player. In some embodiments, the players' online characters may be otherwise affected by the audio analysis information for the respective players. For example, the online characters of currently excited players may be given an "adrenalin boost" that temporarily affects the online characters' capabilities, strength, speed, etc.

As another example of applying audio analysis information within an online game system, the audio analysis information for spectators may be leveraged to identify particular players or teams who are of interest. For example, the audio signals for spectators viewing a particular player or team may indicate that the player/team is involved in an exciting or interesting game event. This information may be displayed or otherwise provided to game players and/or spectators, for example as a marker or other highlight on a displayed game map for the game universe.

As another example of applying audio analysis information within an online game system, the audio analysis information for spectators may be leveraged to affect particular players or teams within the game. For example, the audio signals for spectators viewing a particular player or team may indicate that the player/team has spectator backing or is a spectator favorite. This information may be used to positively affect or reward the player/team within the game, for example by boosting player/team health, providing supplies, providing points, or in various other ways. Conversely, spectator audio analysis may be used to identify players/teams that have low spectator approval, which may be used to negatively affect the players/teams in-game.

As another example of applying audio analysis information within an online game system, the audio analysis information for players and/or spectators may be leveraged to identify particular locations, areas, or regions within the game world at which activity is "hot". For example, the audio signals for players in and/or spectators viewing a particular area or location may indicate that the players and/or spectators are excited and thus that game activity is "hot" in that area. A user interface to the online game may display a map or portion of a map of the online game world, and areas or locations that have been identified as active according to analysis of the audio signals may be marked or highlighted on the map.

Figure 12:
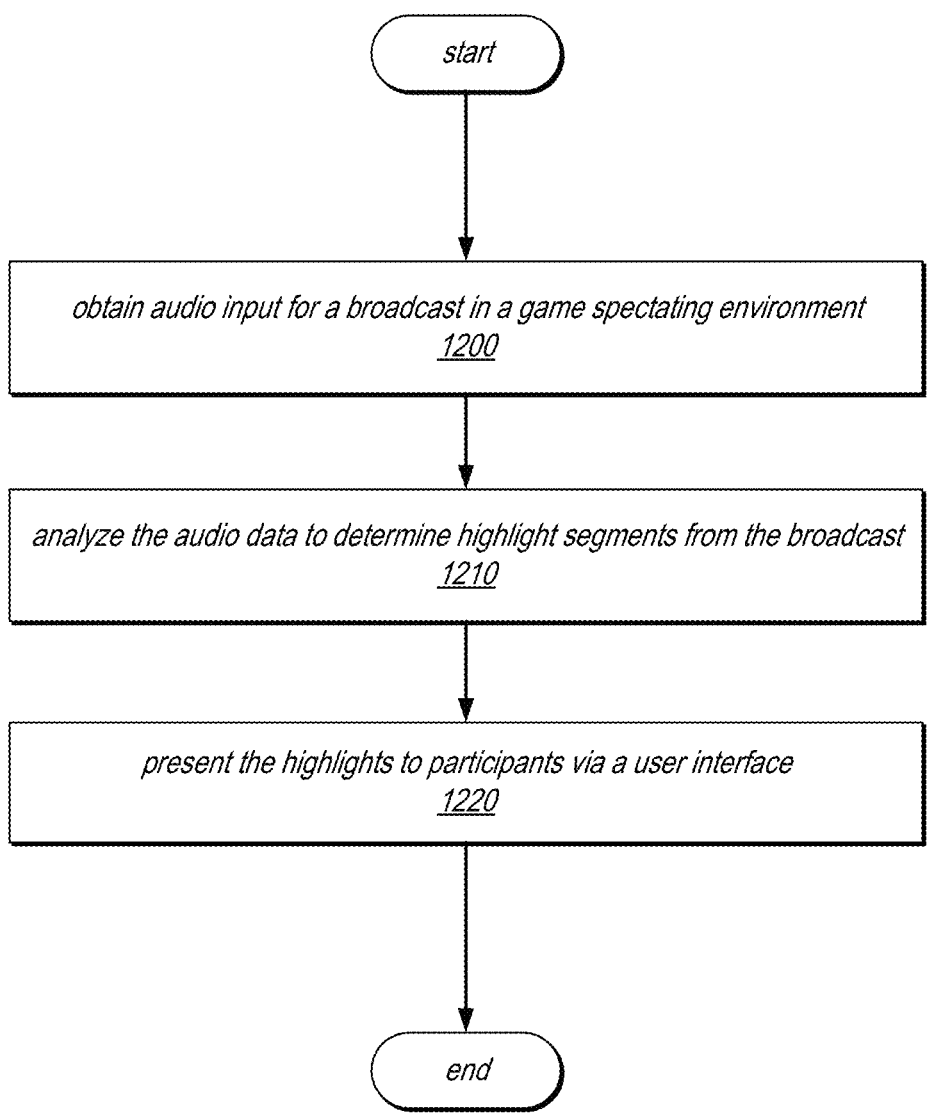
FIG. 12 is a high-level flowchart of a method for determining and presenting highlights in a game spectating environment, according to at least some embodiments.
Figure 13:
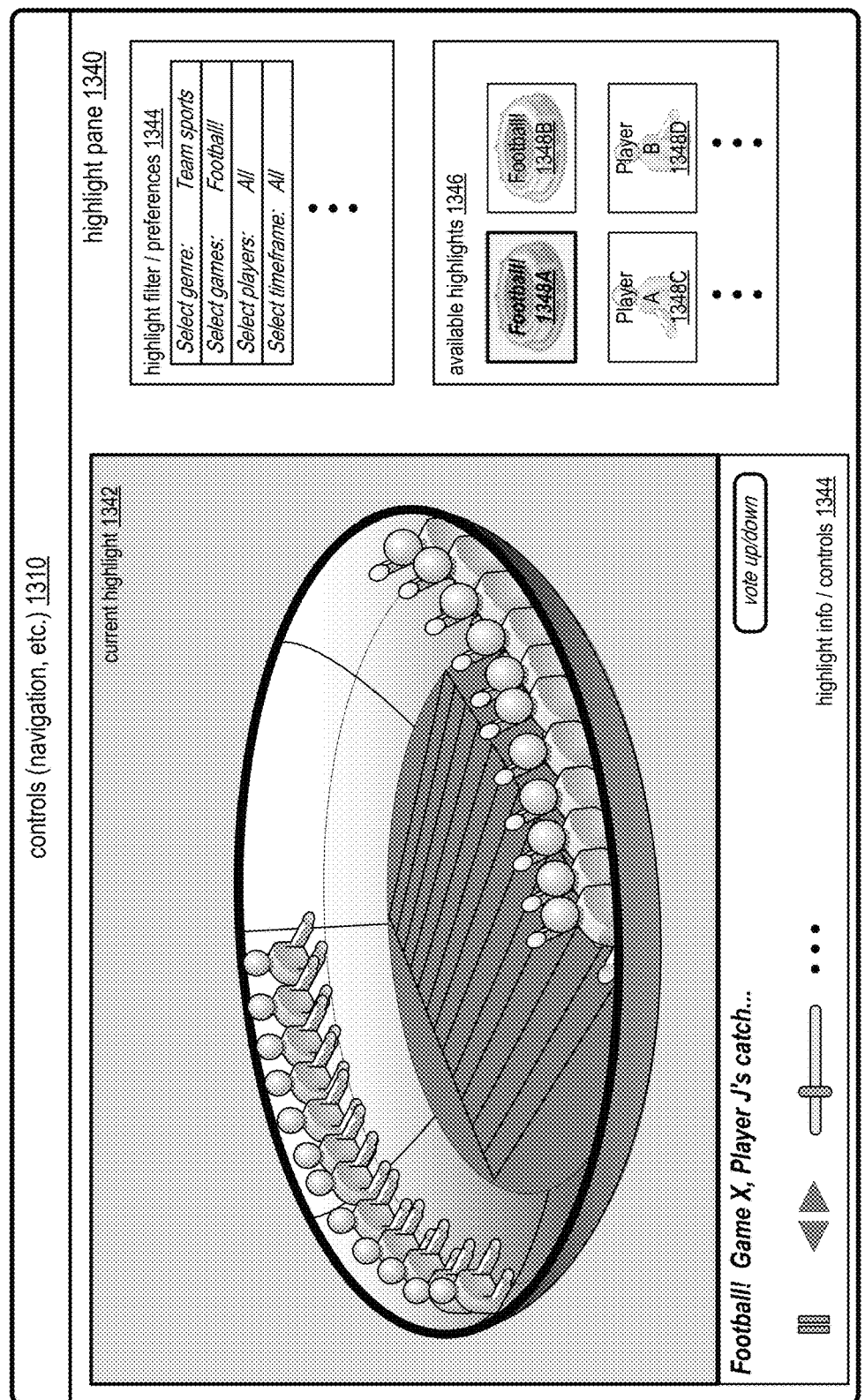
FIG. 13 provides a non-limiting example of a highlight user interface for a game spectating system, according to some embodiments.

As another example of applying audio analysis information within an online game system, the audio analysis information for players and/or spectators may be leveraged to identify the times and locations of particular important events or "highlights" in the game session, and to mark or tag recordings of the game sessions indicating the important events. For example, the audio signals for players in and/or spectators viewing a game session may indicate that the players and/or spectators are excited at particular times and locations, and thus that important or interesting events happened at those times/locations. A recording of the game session or of a participant's view of the game session may be tagged with metadata indicating the times and locations of the detected events. A playback of the game session may then indicate to the viewer(s) the tagged events so that the viewer(s) can jump to the game session highlights. In some embodiments, the game session highlights may be presented to the viewers via a highlight user interface (UI). In some embodiments, the viewers may be allowed to vote on highlights via the UI. FIG. 12 illustrates an example method for determining and presenting highlights in a game spectating environment, according to at least some embodiments. FIG. 13 provides a non-limiting example of a highlight user interface for a game spectating system, according to some embodiments.

In some game system environments, a game session, and thus a recording of the session, may include multiple games, matches, or portions of games. As another example of applying audio analysis information within an online game system, the audio analysis information for participants may be leveraged to identify multiple games, matches, or portions of games (quarters, halves, innings, etc.) within a session. For example, audio signals for participants in a game session may indicate breaks in action at particular times in the session, or may indicate other events that may be used to determine the start and end of games, matches, and so on. A recording of the game session may be tagged with metadata indicating the determined start/stop times of games, matches, etc. on the recording. During a playback of the game session, the game system UI may indicate the tagged events to the viewer(s) so that the viewer(s) can select or jump to particular games, matches, etc.

As another example of applying audio analysis information within an online game system, the audio analysis information for players and/or spectators may be segmented into two or more groups (e.g., opposing teams, fans of particular players or teams, etc.) based on profile information for the respective participants and analyzed separately according to the groups to determine group-specific information about games. For example, the group-specific information may indicate which group of spectators are currently cheering or booing, which group is the loudest and/or quietest, and so on. The group-specific information may be used to provide visual feedback to the players and/or spectators, for example visual feedback indicating current levels of excitement in the groups supporting opposing teams. For example, virtual representations of spectators on one side of a stadium or arena in an online sports game may be made to stand up, wave flags, or otherwise visually respond when spectators that are determined to be fans of a particular team and/or player are cheering or booing loudly.

In some embodiments, game system 100 may record at least some of the game sessions, and the recordings may be made available to players and/or spectators for replay. The recordings may include recorded player and/or spectator audio. As another example of applying audio analysis information within an online game system, the audio information from online game sessions may be analyzed, and the analysis may be used in ranking or recommending recordings of the game sessions and/or to tag events of interest within the recordings of the game sessions. In some embodiments, the spectator and/or player audio generated during the game sessions may be analyzed to determine particular recorded game sessions of interest. In some embodiments, the recordings of interest may be indicated on at least some of the client devices 120, for example by highlighting the recordings on the game client user interface (UI). In some embodiments, the audio generated by the spectators and/or players during the game session may be analyzed to determine particular events of interest within the game session. In some embodiments, the events of interest within a recorded game session may be tagged with metadata stored with the recordings, and the events of interest may be indicated on a client device 120 when playing back the recording, for example by highlighting the events on a timeline of the recorded game session on the game client UI. The analysis of the audio information from the game sessions may be performed during the live game session, or alternatively may be performed on the recorded or archived game session data.

As indicated by the arrow returning from element 204 to element 200, in at least some embodiments, the method of FIG. 2 may be an iterative process in which audio input for a game session is iteratively obtained, analyzed and applied within the online game system while the game session is active.

Figure 3:
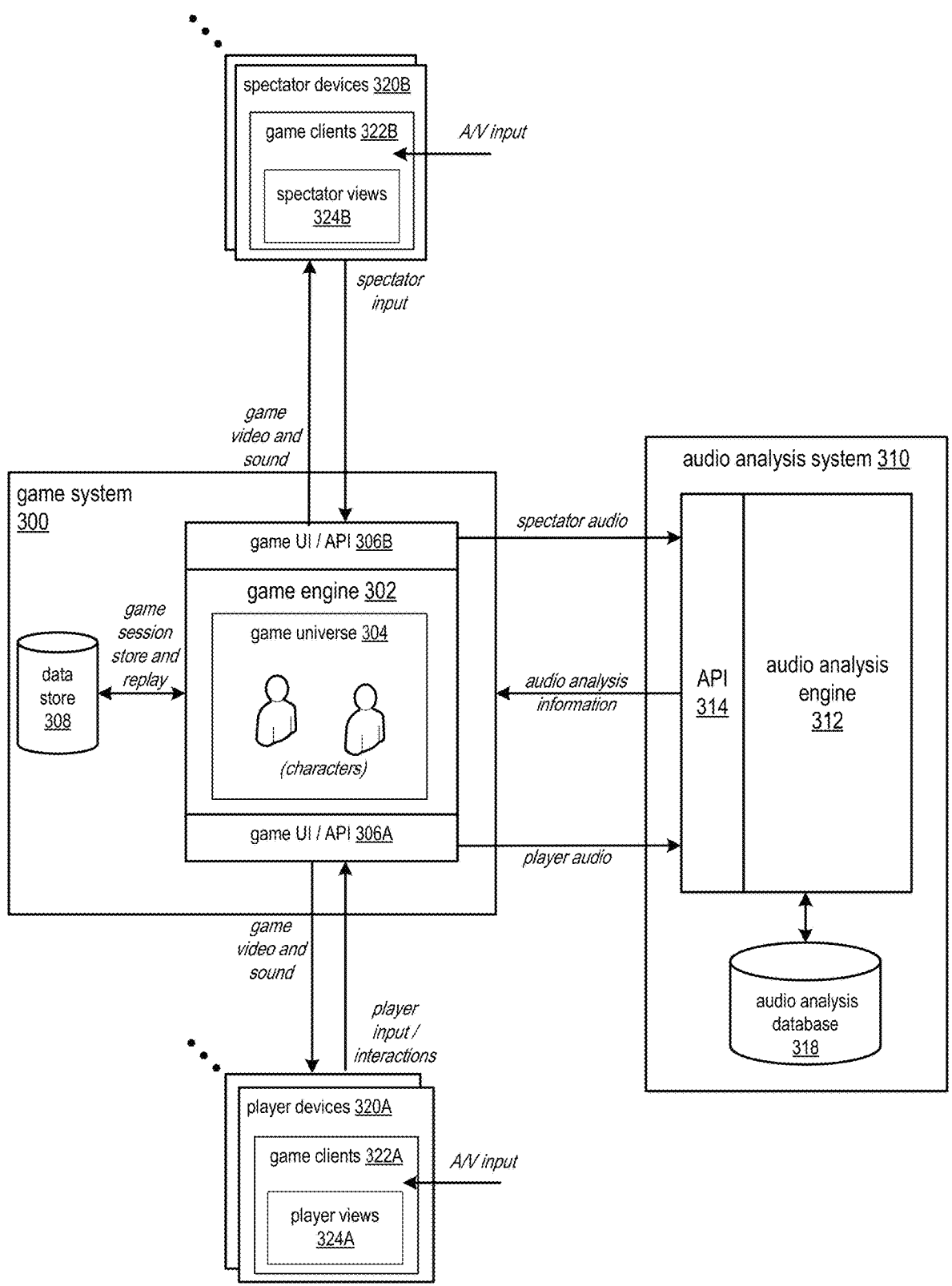
FIG. 3 illustrates an audio analysis module or system that provides analysis of player and/or spectator audio in an online game system, according to at least some embodiments.

FIG. 3 illustrates an audio analysis module or system that provides analysis of player and/or spectator audio in an online game system, according to at least some embodiments. FIG. 3 shows an online game system as illustrated in FIG. 1 in more detail. In some embodiments, an online game system may include a game system 300 and multiple client devices; the client devices may include player devices 320A and spectator devices 320B. The online game system may also include an audio analysis module or system 310.

Figure 18:
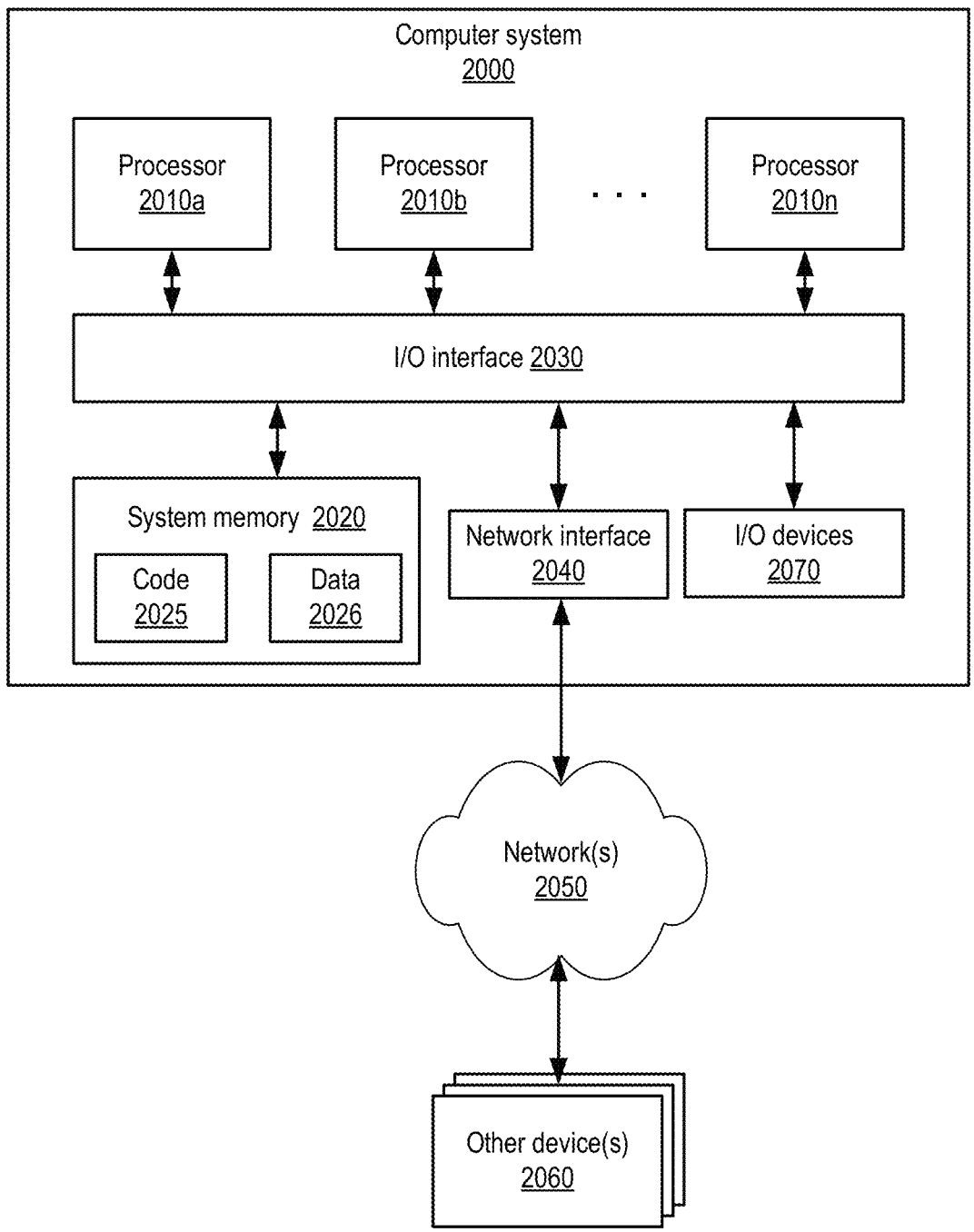
FIG. 18 is a block diagram illustrating an example computer system that may be used in some embodiments.

In at least some embodiments, a game system 300 stores game data and information in a data store 308, implements game logic (game engine 302), and serves as an execution environment for the online game. The game system 300 may also implement one or more user interfaces (UIs) and one or more application programming interfaces (APIs) (shown as UI/API 306A and 306B) to the game system functionality. In some embodiments, game system 300 may include one or more computing devices, for example one or more server devices, that implement the game logic, and may also include other devices including but not limited to storage devices that store game data including but not limited to recordings of game sessions and participant information. However, in some embodiments, functionality and components of game system 300 may be implemented at least in part on one or more of the client devices. An example computing device that may be used in a game system 300 is illustrated in FIG. 18.

A client device 320 may be any of a variety of consumer devices including but not limited to desktop computer systems, laptop/notebook computer systems, pad/tablet devices, smartphone devices, game consoles, handheld gaming devices, and wearable devices. Wearable devices may include, but are not limited to, gaming glasses or goggles and gaming "watches" or the like that are wearable on the wrist, arm, or elsewhere. Thus, client devices 320 may range from powerful desktop computers configured as gaming systems down to "thin" mobile devices such as smartphones, pad/tablet devices, and wearable devices. Each client device 320 may implement an operating system (OS) platform that is compatible with the device. A client device may include, but is not limited to, input and output components and client software (game client 322) for the online game via which respective players can participate in a game session currently being executed by the game system 300, and via which one or more spectators may watch current game sessions or recorded game sessions. The game client 322 on a particular client device 320 may be tailored to support the configuration and capabilities of the particular device type and the OS platform of the device. An example computing device that may be used as a client device 320 is illustrated in FIG. 18.

In at least some embodiments, the game system 300 may implement an online multiplayer game, and the game system 300 may be or may include one or more devices on a network of a game provider that implement the game engine 302 and UI/API 306 and that serve as or provide an execution environment for the online multiplayer game. In these online multiplayer game environments, client devices 320 are typically remotely located from the game system 300 and access the game system 300 via wired and/or wireless connections over an intermediate network or networks such as the Internet. Further, client devices 320 may typically have both input and output capabilities for playing and/or spectating the online multiplayer game.

In some embodiments, instead of a game system 300 implemented according to a client-server model or variation thereof in which one or more devices such as servers host most or all of the functionality of the online game, a game system 300 may at least in part be implemented as or on local devices that implement at least a portion of the game logic, for example gaming consoles that serve as local execution environments for console-based online multiplayer games installed on the console or executed from media inserted into the console. One or more client devices 320 may be local to the system 300 and access the system 300 via local wired or wireless connections for game play or spectating.

In some embodiments, instead of a game system 300 implemented according to a client-server model or variation thereof in which one or more devices such as servers host most or all of the functionality of the game system 300, a game system 300 may be implemented according to a distributed or peer-to-peer architecture in which at least some of the game functionality and components of the game system 300 are distributed among one, two, or more client devices that collectively participate in a peer-to-peer relationship to execute, play in, and/or spectate game sessions.

In some embodiments, an online game system may also include an audio analysis module or system 310. In some embodiments, audio analysis system 310 may include one or more computing devices, for example one or more server devices, that implement an audio analysis engine 312 and one or more application programming interfaces (APIs) 314 to the audio analysis functionality. Audio analysis system 310 may also include other devices including but not limited to storage devices that store audio analysis information (shown as audio analysis database 318) for individual participants, groups, crowds, and/or games including but not limited to audio content patterns that can be matched or mapped to individual participants' states, group or crowd states, particular game events, and so on. In some embodiments, audio analysis system 310 may be implemented as a separate system from game system 300, for example as a network-based service that is accessible by one or more entities including but not limited to game system 300. In some embodiments, audio analysis system 310 may instead be implemented as a component, module, or subsystem of a game system 300. FIGS. 14 and 15 illustrate operations of an example audio analysis system 310, according to at least some embodiments.

In some embodiments, audio analysis system 310 functionality may be implemented in part on client devices 320. For example, in some embodiments, an audio analysis client module may be installed on at least some client devices 320, may locally perform audio analysis for a participant (player or spectator) associated with the client device 320, and may stream or upload the participant audio analysis information to the game system 300 and/or audio analysis system 310 for aggregation and analysis with other audio information. FIG. 16 illustrates analysis of audio performed at least in part on client devices in an online game system, according to at least some embodiments.

For a particular game session, the game engine 302 of the game system 300 may generate a game universe 304 that includes the game session's context, characters, and environment. The players manipulate their characters within this universe 304 via the players' client devices 320A. The game system 300 may generate and display a view 324A of the game universe 304 from the perspective of each player's character to the player via the game client 322A on the player's respective client device 320A, and may receive player input to and interactions with the game universe 304 via the player's manipulation of each player's respective character via the game client 322 on the player's respective client device 320A. The game system 300 may also generate and display a view 324B of the game universe 304 from the current perspective or viewpoint of each spectator via the game client 322B on the spectator's respective client device 320B. However, note that the spectators typically do not have characters or avatars that appear within the game universe 304.

The following is a broad description of an example method for game execution, and is not intended to be limiting. Typically, game logic/execution of the game system 300 is implemented in game engine 302 according to event-driven architecture in which a game event loop monitors for and reacts to players' inputs to and interactions with the game universe 304 via their characters as controlled by client devices 320A. Based upon the players' inputs and interactions with the universe 304 and on other game factors (e.g., scripted events and/or a randomness component) at iterations of the game event loop, the game session progresses along a game session timeline, with the game universe 304 being modified and updated accordingly.

In some embodiments, concurrent with the game event loop execution, game system 300 renders a 2D or 3D representation of the universe 304 based on the current state of the universe 304, generates video and sound according to a video frame rate based upon the rendering, and sends or streams the video and sound output to the client devices 320A and/or 320B for display. Note that video and sound may be generated for and sent or streamed to each client device 320A or 320B according to a corresponding participant's current perspective or view of the universe 304. The game clients 322 on these client devices 320 may be referred to as "thin" game clients as the game clients may not implement a 2D or 3D rendering component. However, in some embodiments, at least a portion of the actual rendering may be performed by "thick" game clients 322 on the client devices 320 that do implement a 2D or 3D rendering component. In these implementations, instead of the game system 300 performing the full rendering of the game universe 304 into video and sound and sending the video and sound to "thin" game clients 322 on client devices 320 for display, the game system 300 may instead send universe 304 data to the client devices 320 from which thick game clients 322 can render and display video and sound.

Client devices 320 may include audiovisual (A/V) components such as video cameras and microphones that may receive audio (e.g., voice or speech) input from game players and/or spectators during game play and/or spectating. In some embodiments, game system 300 may receive player audio input from player devices 320A, and may also receive spectator audio input from spectator devices 320B. In some embodiments, the game system 300 may receive the audio input via UI/API 306A and 306B. The audio input may, for example, be received by game system 300 as audio tracks in video input, as Voice over IP (VoIP), or according to other network formats or protocols that support digital audio transmission. Game system 300 may communicate with the audio analysis system 310 via API 314 to provide spectator and/or player audio to the audio analysis system 310 for analysis and to receive audio analysis information from the audio analysis system 310. The game system 300 may then apply the audio analysis information to affect game play in various ways, for example as described in reference to element 204 of FIG. 2.

While embodiments are primarily described in the context of analyzing and applying audio input in a game system 300, it is to be noted that embodiments may also analyze content of other participant input to a game system 300, for example text input to a chat user interface element provided by the game client 322 interface, and may use that analysis alone or in combination with the audio analysis to detect states of participants and affect an online game and/or spectating system broadcast, for example as described in reference to element 204 of FIG. 2. In addition, some embodiments may also collect and analyze other data from the participants, including but not limited to images of the participants' faces and/or eyes, and may use that analysis alone or in combination with the analysis of the participant audio and/or textual inputs to detect states of participants and to affect an online game and/or spectating system broadcast as described herein.

Audio Analysis and Application in a Game Spectating System

Figure 4:
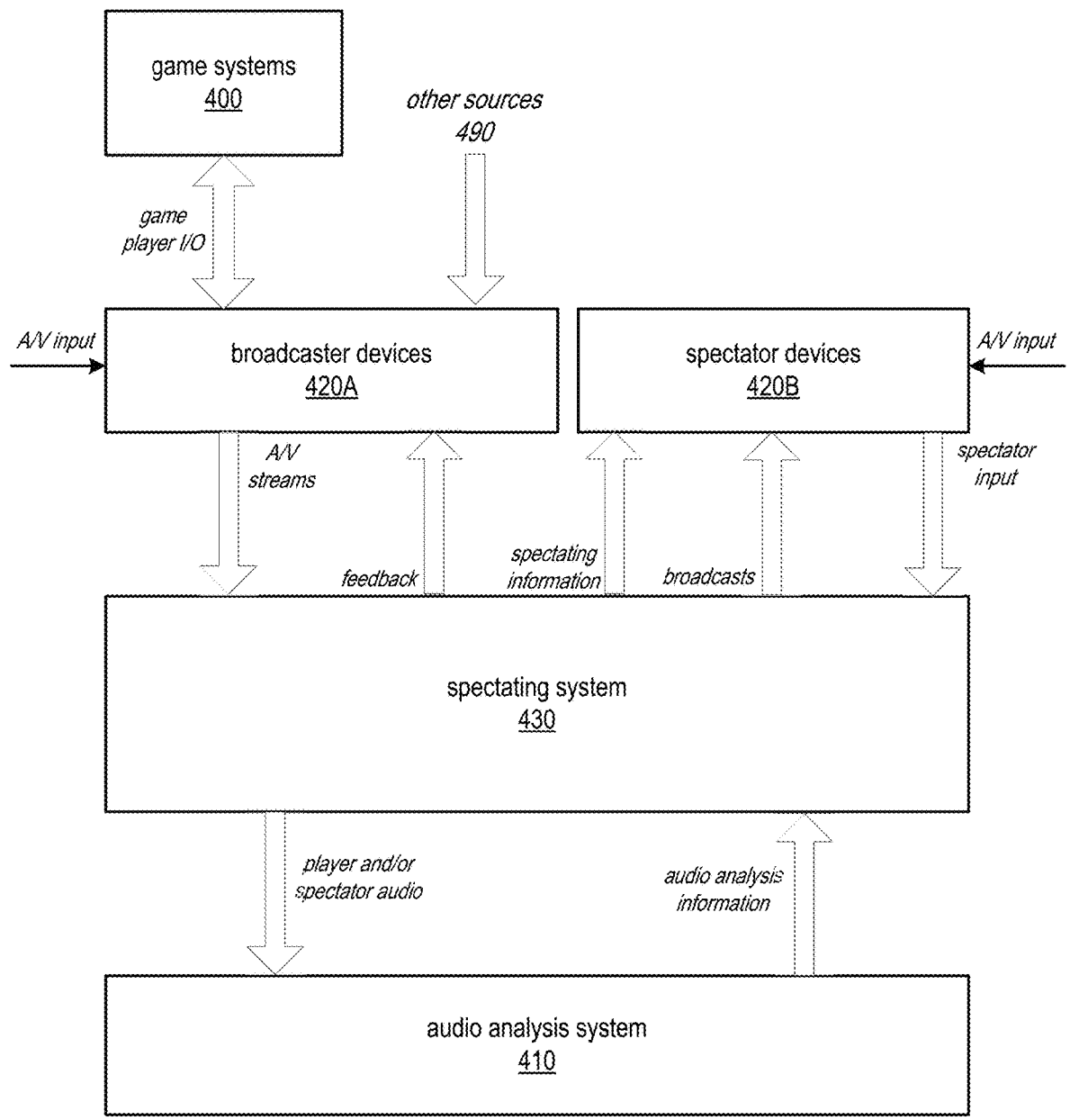
FIG. 4 is a high-level block diagram that illustrates providing analysis of player and/or spectator audio in a game spectating system, according to at least some embodiments.

FIG. 4 is a high-level block diagram that illustrates providing analysis of player and/or spectator audio in a game spectating system, according to at least some embodiments. A game spectating system may include a spectating system 430, one or more game systems 400, and multiple client devices; the client devices may include broadcaster devices 420A and spectator devices 420B. Each broadcaster device 420A may include, but is not limited to, input and output components and game client software for at least one online game 400 via which respective players can participate in game sessions currently being executed by the game system(s) 400. Each broadcaster device 420A may also include input and output components (e.g., video cameras and microphones) and broadcasting client software for the spectating system 430 via which respective players (or broadcasters) may generate live A/V streams of their online game play and commentary for broadcasting to spectators via the game spectating system 430. The players or broadcasters may also receive spectator feedback (e.g., audio and/or textual commentary or chat) from the spectating system 430, for example via the broadcasting client software. Each spectator device 420B may include, but is not limited to, input and output components and spectating client software via which respective spectators may interact with the spectating system 430 to select, receive, and view live broadcasts from the broadcasters or playbacks of previously recorded broadcasts, and via which the spectators may provide spectator feedback (e.g. audio or textual commentary) for broadcasts.

Spectating system 430 may be a network-based video streaming system that may allow players to broadcast live streams of their online game play to tens, hundreds, thousands or more spectators, while allowing the spectators to select the broadcasts of particular players (also referred to as channels) for viewing. A spectating system 430 may support live broadcasts for one, two, or more different game systems 400, and may support live streaming of broadcasts from tens, hundreds, or thousands of broadcaster devices 420A to the spectator devices 420B. In some embodiments, a spectating system 430 may record at least some live broadcasts and allow the recorded broadcasts to be played back for viewing by spectators.

While FIG. 4 shows game systems 400 as separate from spectating system 430, in some embodiments, at least one game system 400 may be implemented at least in part by spectating system 430. In some embodiments, one or more broadcaster devices 420A may be implemented within spectating system 430.

In some embodiments, a spectating system 430 may support broadcasts of live and/or recorded digital media content via broadcaster devices 420A from sources 490 other than game systems 400. For example, in some embodiments, the spectating system 430 may support live or recorded broadcasts of streams from sports games, competitions, concerts, and other events including but not limited to live streams from electronic spectator sports (eSports) competitions. eSports (also referred to as competitive gaming) generally refers to organized multiplayer video game competitions. For example, video cameras and audio equipment may be installed in an arena or other venue in which an event such as a sports game or an eSports competition is being held. Video and/or audio feeds from the equipment may be input to one or more broadcaster devices 420A that may composite and stream the audio/video (A/V) inputs to the spectating system 430. For eSports events, game A/V may be added to the stream along with the feeds from the cameras and audio equipment. Commentators and/or broadcasters may input their audio, text, and/or video content into the stream as well. The live stream may be broadcast to spectator devices 420B by the spectating system 430, and/or may be recorded for rebroadcast. Spectators may view the broadcast on spectator devices 420B, and may also input A/V and/or text input via the spectating system 430 clients on their devices 420B.

The game spectating system may also include an audio analysis module or system 410. In some embodiments, audio analysis system 410 may include one or more computing devices, for example one or more server devices, that implement an audio analysis engine that provides audio analysis functionality and one or more application programming interfaces (APIs) to the audio analysis functionality. Audio analysis system 410 may also include or access other devices including but not limited to storage devices for storing audio analysis information for individual participants (players, broadcasters, and/or spectators), groups, crowds, and/or games including but not limited to audio content patterns (emotion and/or speech patterns) that can be matched or mapped to individual participants' states, group or crowd states, particular game events, keywords and key phrases, and so on. In some embodiments, audio analysis system 410 may be implemented as a separate system from spectating system 430, for example as a network-based service that is accessible by one or more entities including but not limited to spectating system 430. In some embodiments, audio analysis system 410 may instead be implemented as a component, module, or subsystem of spectating system 430. FIGS. 14 and 15 illustrate components and operations of an audio analysis system 410, according to at least some embodiments.

In some embodiments, audio analysis system 410 functionality may be implemented in part on client devices 420. For example, in some embodiments, an audio analysis client module may be installed on at least some client devices 420, may locally perform audio analysis for a participant (broadcaster or spectator) associated with the client device 420, and may stream or upload the participant audio analysis information to the spectating system 430 and/or audio analysis system 410 for aggregation and analysis with other audio information. FIG. 16 illustrates analysis of audio performed at least in part on client devices in a game spectating system, according to at least some embodiments.

Figure 5:
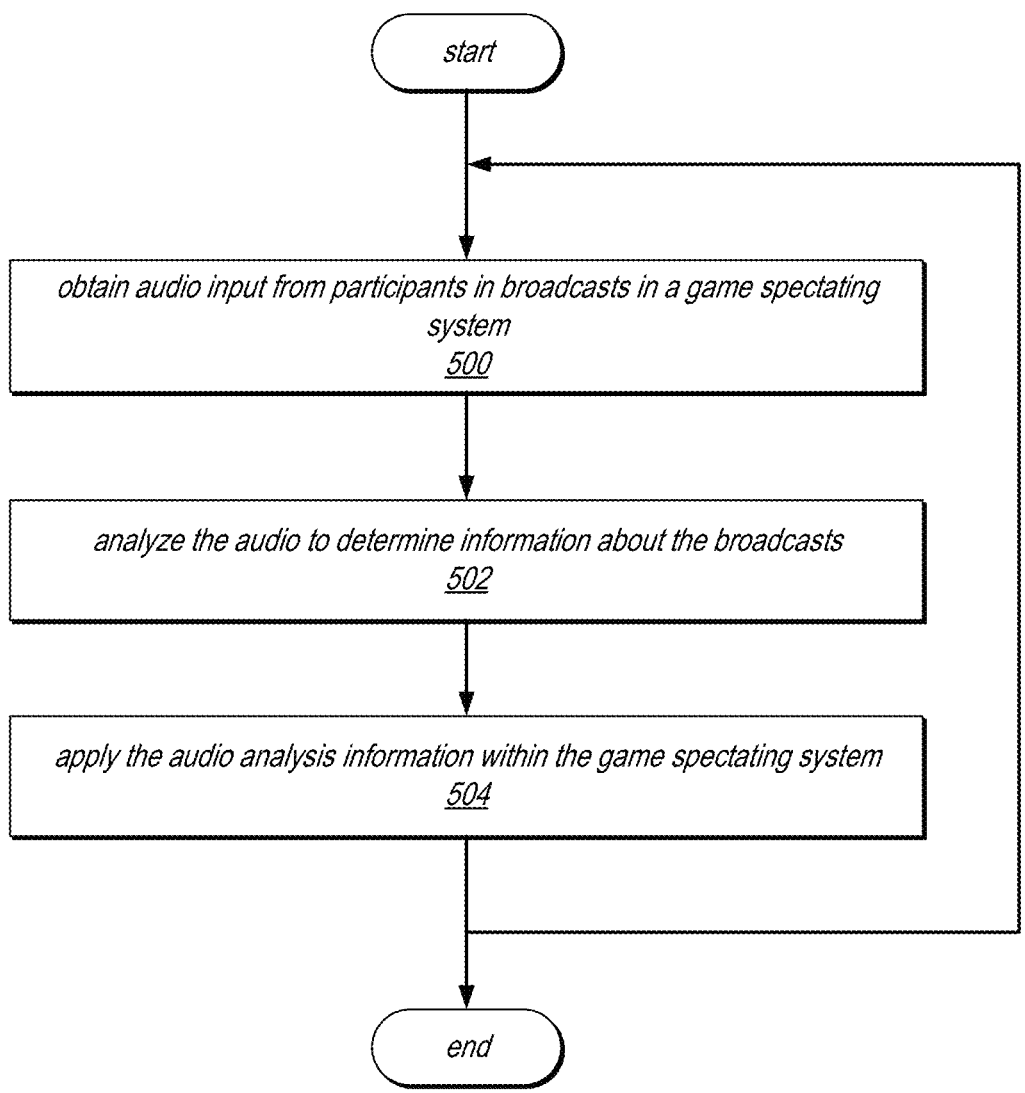
FIG. 5 is a high-level flowchart of a method for analyzing and applying player audio in a game spectating system, according to at least some embodiments.

FIG. 5 is a high-level flowchart of a method for analyzing and applying player audio in a game spectating system, according to at least some embodiments. The method of FIG. 5 may, for example, be implemented in a game spectating system as illustrated in FIG. 4.

As indicated at 500 of FIG. 5, digital audio input may be obtained from participants (broadcasters and/or spectators) in active broadcasts in a game spectating system. Referring to FIG. 4, in some embodiments, client devices 420 may include audiovisual (A/V) components that may receive and digitize audio (e.g., voice or speech) input from broadcasters and/or spectators during broadcasts. In some embodiments, spectating system 430 may receive broadcaster audio input from broadcaster devices 420A, and may also receive spectator audio input from spectator devices 420B. The digital audio input may, for example, be received by spectating system 430 as an audio track in video input, as Voice over IP (VoIP), or according to other network formats or protocols.

In some embodiments, metadata may be obtained for the audio input signals. The metadata may, for example, identify respective participants corresponding to the audio input signals, indicate whether a participant is a broadcaster or a spectator, and indicate other known information about the participant and/or broadcast. In some embodiments, at least some of the metadata may be obtained from profile information for participants (spectators and/or broadcasters) in the spectating system, for example from participant profiles maintained by the spectating system 430 and/or game systems 400. For broadcasters, the metadata may, for example, indicate the identity of the broadcaster within the spectating system, indicate the online game 400 that the broadcaster is currently playing/broadcasting, indicate the broadcaster's roles or characters within the virtual game universe of the online game 400, indicate the broadcaster's affiliations (e.g., groups or teams) in the online game 400, indicate the current location, orientation, view, status, time (within the game universe or game session timeline) and other information for the broadcaster's character within the game session or game universe, indicate the broadcaster's broadcasting and game playing histories, and so on. For spectators, the metadata may, for example, uniquely identify the spectator, identify the game and broadcast that the spectator is currently watching, indicate the spectator's affiliations (e.g., favorite team) in the online game universe, indicate a current location and/or view for the spectator in the game universe (e.g., which side of a stadium the spectator is (virtually) located at), spectating history, and so on.

As indicated at 502 of FIG. 5, the digital audio input may be analyzed to determine information about the broadcasts. Referring to FIG. 4, in some embodiments, the spectating system 430 may provide the received audio input to an audio analysis system 410. The audio analysis system 410 may perform signal analysis, for example time- and frequency-domain analysis, on the audio signals to determine one or more metrics (voice and/or speech metrics) from the audio signals. The metrics may, for example, include one or more of amplitude, pitch, duration, and frequency metrics, and in general any relevant metric that can be extracted from an audio or voice signal. The audio signal metrics may be analyzed, for example by comparing the metrics to known or learned audio content patterns for individual participants or groups of participants according to one or more emotion recognition and speech recognition techniques, to determine information about the participants and/or the broadcasts.

In some embodiments, the audio signals may be individually analyzed to determine voice and/or speech metrics for each audio input, and the metrics may then be aggregated and analyzed to determine information about groups of participants (e.g., crowds of spectators) associated with a broadcast or broadcasts. In some embodiments, instead of or in addition to separately analyzing the audio signals and then aggregating the metrics for further analysis, the audio signals from a broadcast may be aggregated or combined and analyzed collectively to generate metrics for and information about the spectators watching the broadcast. For example, the audio signals may be aggregated and analyzed as "crowd noise" for the broadcasts.

In some embodiments, the metadata obtained for the audio input signals may be used when analyzing the audio input signals to determine information about the broadcasts, spectators, players, and/or games. For example, the metadata may indicate affiliations or team preferences for spectators of a sports game based on the spectators' profile information maintained by the spectating system 430. The spectator audio signals for a game may be segmented into two or more groups according to the metadata (e.g., into groups of fans of two opposing teams in a sports game such as football according to the spectators' indicated team affiliations) and analyzed separately according to the groups to determine group-specific information about the games in the spectating system. For example, the group-specific information may indicate which group of spectators are currently cheering or booing, which group is the loudest and/or quietest, and so on. Player audio signals may also be segmented into groups (e.g., opposing teams in a game) according to player profile information for player group analysis.

In some embodiments, the determined information may, for example, indicate an emotion or emotional state or states (e.g., excitement, stress, fear, shock, surprise, amusement, anger, sadness, happiness, frustration, etc.) of individual participants (broadcasters and/or spectators) based on the analysis of the individual participants' vocalizations or other sounds in the respective audio signals. In some embodiments, the determined information may instead or also indicate a state or states for a group or crowd of participants (e.g., excitement, stress, approval, disapproval, etc.) based on an analysis of the combined audio signal metrics for two or more participants (broadcasters and/or spectators). In some embodiments, the information may also indicate a level for a determined state, for example an indication of how excited a group or crowd of spectators watching a particular broadcast appears to be based on an analysis of aggregated spectator audio input for the broadcast.

In some embodiments, the determined information may also indicate particular events in a broadcast or game session being streamed. For example, in some embodiments, at least some of the audio patterns to which the audio signal metrics from a broadcast are matched may be mapped to particular types of events in an online game that is being broadcast on a broadcaster's channel. For example, in a sports game, particular crowd (spectator) and/or player audio patterns may be mapped to big plays, such as scoring plays or great defensive plays. In some embodiments, the information may anticipate or predict a potential upcoming event in an online game session. For example, in a sports game, particular crowd (spectator) and/or player audio patterns may be mapped to what typically happens prior to a particular big event, such as crowd silence or chanting before an important offensive play in a football game, or very low crowd noise before a big defensive play in a football game. In some embodiments, the information may also indicate locations and times for particular game universe events to which the analyzed audio signals are mapped. For example, analysis of spectator and broadcaster audio signals and the correlated metadata may indicate a particular location or area in an online game universe, and a particular time within the game timeline, for a game session being broadcast by the broadcaster.

In some embodiments, the audio inputs for two or more broadcasts may be separately analyzed to determine audio metrics for each broadcast (e.g., how loud or excited the crowd of spectators watching the broadcast are, or how excited or vocal the respective broadcaster is), and then the metrics for the broadcasts may be collectively analyzed to determine meta-information about the broadcasts, for example which broadcast is currently most popular, which broadcast has the loudest or most crowd noise, and so on.

In some embodiments, a spectating system 430 may support broadcasts of live and/or recorded digital media content via broadcaster devices 420A from sources 490 other than game systems 400. For example, in some embodiments, the spectating system 430 may support broadcasts of live streams from sports games, competitions, concerts, and other events including but not limited to live streams from electronic spectator sports (eSports) competitions. For example, video cameras and audio equipment may be installed in an arena or other venue in which an event such as a sports game or an eSports competition is being held. Video and/or audio feeds from the equipment may be input to one or more broadcaster devices 420A that may composite and stream the audio/video (A/V) inputs to spectators via the spectating system 430. Commentators, broadcasters, and spectators may input their audio, text, and/or video content to the broadcast as well. In these embodiments, audio, text, or other inputs including but not limited to commentator, broadcaster, and spectator audio and text may be analyzed to determine information about the events being broadcast, and the determined information may be applied to the broadcasts in the spectating system environment in various ways, for example as described below in reference to element 504.

Figure 8:
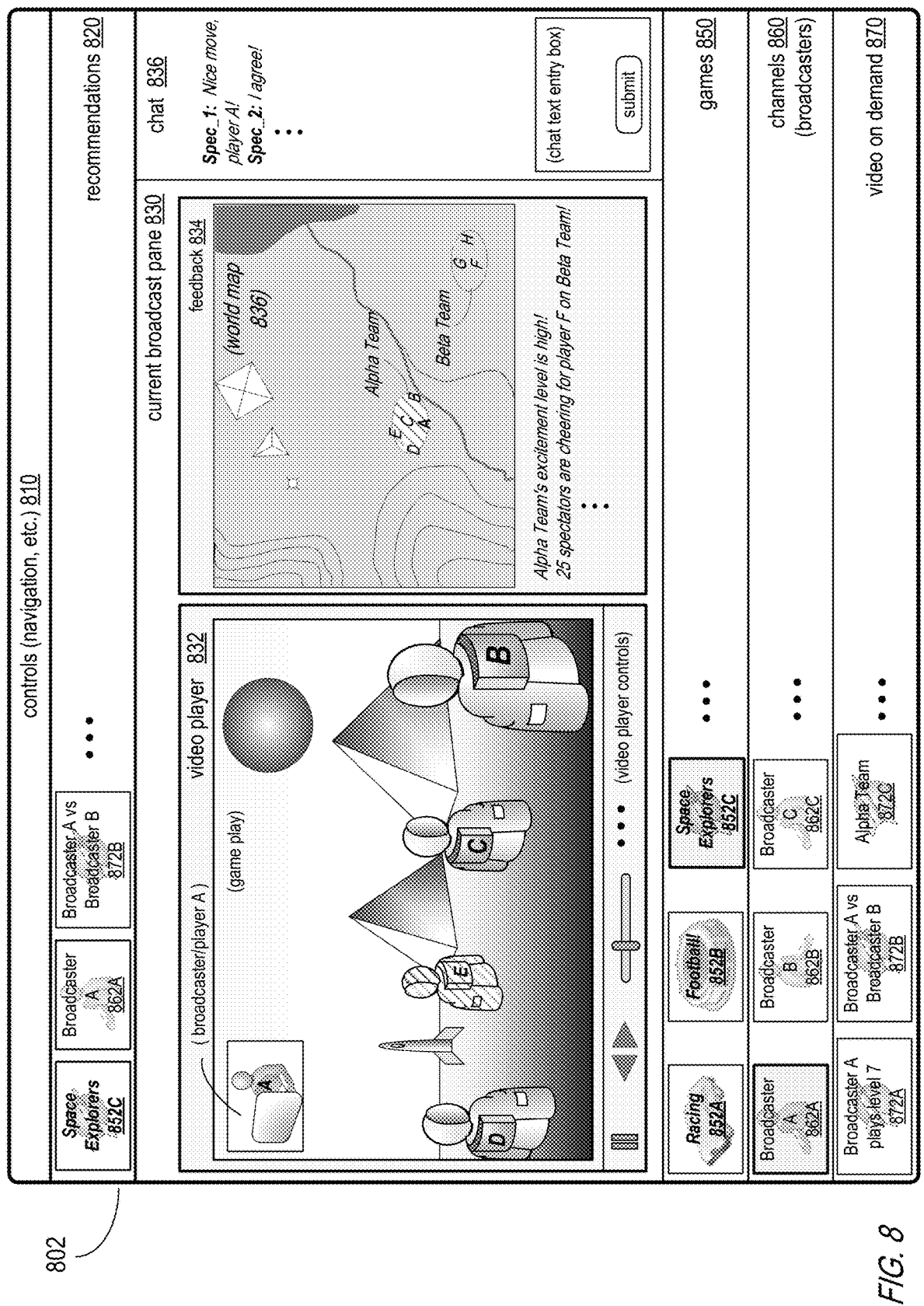
FIG. 8 provides a non-limiting example of a spectating user interface for a game spectating system, according to some embodiments.
Figure 9:
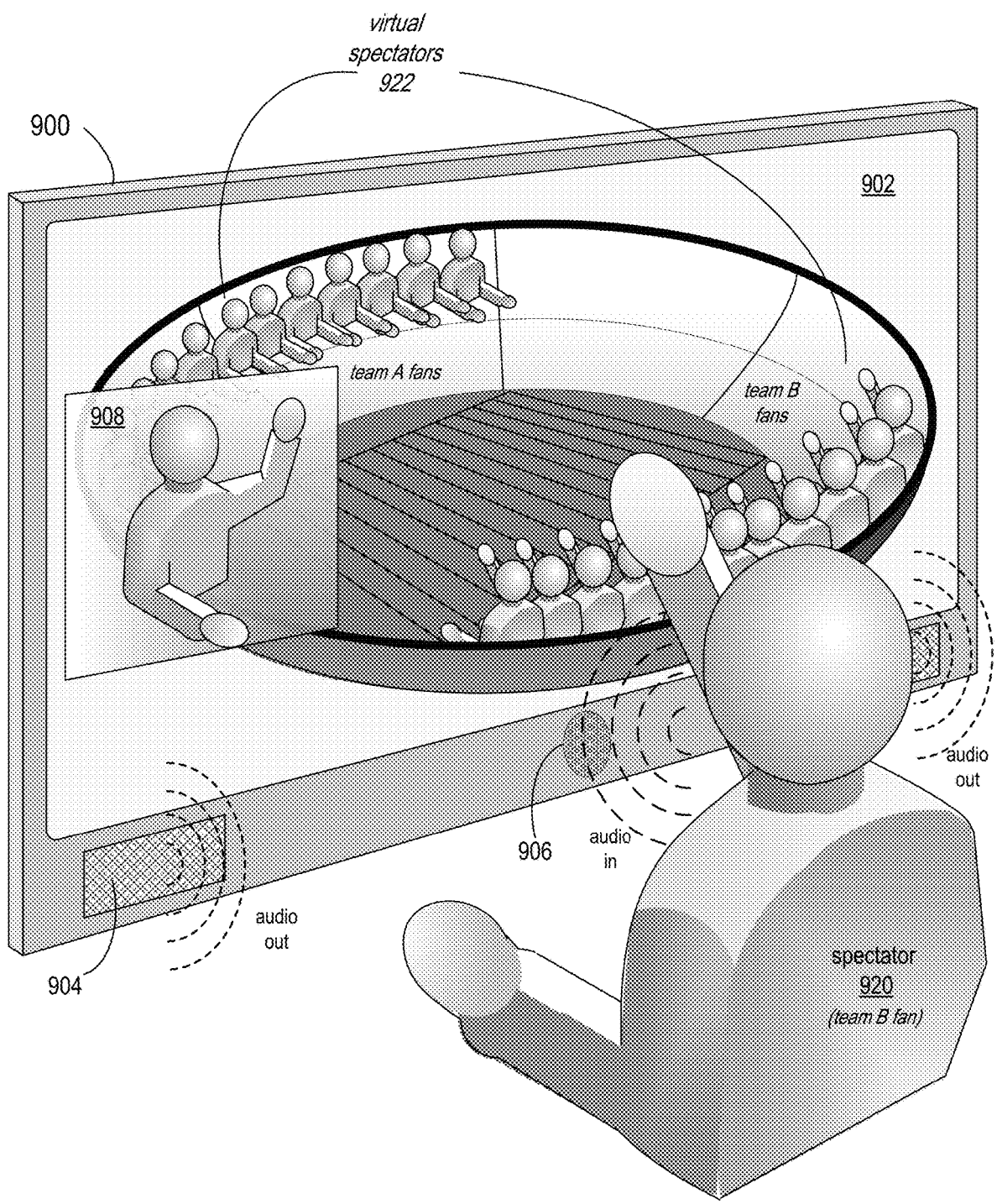
FIG. 9 provides another non-limiting example of a spectating user interface for a game spectating system, according to some embodiments.
Figure 10:
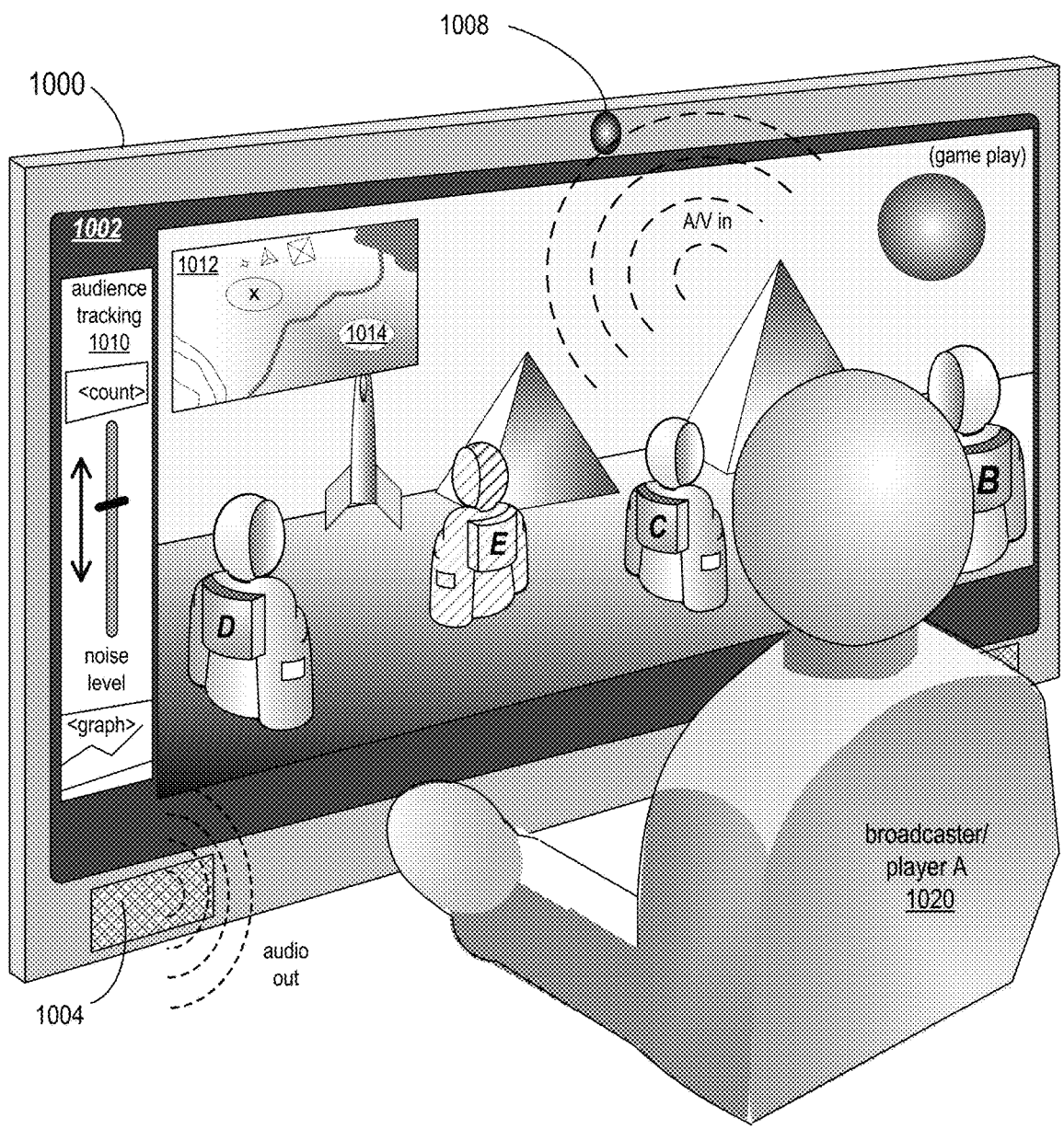
FIG. 10 provides a non-limiting example of a broadcaster user interface for a game spectating system, according to some embodiments.

As indicated at 504 of FIG. 5, the audio analysis information may be applied within the game spectating system. In some embodiments, the audio analysis information may be used to provide visual or other feedback to the participants within the game spectating system, for example by displaying game and/or spectating information for spectators via a spectating user interface (UI) to the game spectating system 430 provided by a spectating client executing on the spectator devices 420B. FIGS. 8 and 9 provide non-limiting examples of a spectating UI for a game spectating system, according to some embodiments. In some embodiments, the audio analysis information may also be used to display game and/or spectating information for the broadcasters via a broadcaster user interface (UI) provided via a broadcasting client on the broadcaster devices 420A. FIG. 10 provides a non-limiting example of a broadcaster UI for a game spectating system, according to some embodiments. The following provides several examples of applying audio analysis information within a game spectating system. However, note that these examples are not intended to be limiting.

As an example of applying audio analysis information within a game spectating system, the audio analysis information for spectators of one or more broadcasts of a particular online game may be leveraged to identify particular players, locations, areas, or regions within a game world of the online game being broadcast for which activity is "hot", for example as illustrated in FIG. 8. A map or portion of a map of the online game world may be displayed on at least some of the spectator devices 420B, for example by a spectating UI as illustrated in FIG. 8, and players, teams, areas, regions, or locations that have been identified as active within the game according to analysis of the audio signals may be marked or highlighted on the map. In some embodiments, instead of or in addition to a map of active or interesting players and/or locations, textual information may be displayed indicating particularly players and/or locations of interest as determined by analysis of the audio signals. In some embodiments, audio announcements or sounds may be used to call attention to particular players and/or locations. In some embodiments, the information about players and/or locations of interest within a game world may also be provided to the game players, for example via feedback of the audio analysis information to the broadcaster devices 420A and/or to the game system 400.

As another example of applying audio analysis information within a game spectating system, the audio analysis information may indicate an emotion or emotional state (e.g., stress, excitement, anger, sadness, happiness, frustration, etc.) for one or more of the broadcasters, and the players' avatars or online characters in the game universe may be visually or otherwise affected in response to the respective broadcaster's detected state, for example as illustrated in FIG. 8.

As another example of applying audio analysis information within a game spectating system, the audio analysis information for spectators may be leveraged to affect the game characters and game play of the broadcasters. For example, the audio signals for spectators viewing a particular player's broadcast may indicate that the player/broadcaster has spectator backing or is a spectator favorite when compared to other players in the game, for example as illustrated in FIG. 10. This information may be used to positively affect or reward the player within the game, for example by boosting player health, providing supplies, providing points, or in various other ways. Conversely, spectator audio analysis may be used to identify players that have low spectator approval, which may be used to negatively affect the player in-game. In some embodiments, teams of players corresponding to broadcasters may be identified, and the teams may be affected in-game by the analysis of spectator audio for broadcaster(s) that are on the team.

As another example of applying audio analysis information within a game spectating system, aggregated audio analysis information for spectators of broadcasts of online games may be leveraged to identify particular currently active channels or broadcasts of interest, for example as illustrated in FIG. 8. In some embodiments, the channels of interest may be indicated on at least some of the spectator devices 420B, for example by highlighting the channel(s) on a spectating UI, or adding the channels to a "recommended" or "hot" list for currently active channels. In some embodiments, the information about channels of interest may also be provided to the broadcasters, for example via feedback of the audio analysis information to the broadcaster devices 420A indicating comparative channel popularity or ranking according to analysis of crowd noise for the respective channels.

As another example of applying audio analysis information within a game spectating system, aggregated audio analysis information for spectators of broadcasts of online games may be leveraged to identify particular broadcasters of interest. In some embodiments, the broadcasters of interest may be indicated on at least some of the spectator devices 420B, for example by highlighting the broadcasters and/or the channel(s) associated with the identified broadcasters on the spectating UI, or adding the broadcaster(s) to a "recommended" or "hot" list for broadcasters, for example as illustrated in FIG. 8. In some embodiments, the information about broadcasters may also be provided to the broadcasters, for example via feedback of the audio analysis information to the broadcaster devices 420A indicating the broadcasters' respective current popularity according to analysis of crowd noise on the broadcasters' respective channels.

As another example of applying audio analysis information within a game spectating system, the aggregated audio analysis information for spectators of broadcasts of online games may be leveraged to identify particular online games of interest, for example games for which activity is currently "hot" or interesting according to the "crowd noise" within the current game. In some embodiments, the games of interest may then be indicated on at least some of the spectator devices 420B, for example by highlighting the games on the spectating UI, for example as illustrated in FIG. 8.

As another example of applying audio analysis information within a game spectating system, the spectator audio signals for a game or broadcast may be used to detect affiliations or preferences of spectators and to segment the spectators into two or more groups (e.g., fans of particular players or teams) based on the analysis. For example, spectators may be detected to be fans of a particular player or team based at least in part on their audible input (cheering, booing, loud, quiet, etc.) at particular times or in response to particular events in a game or broadcast. As another example, spectators may be detected to be fans of a particular player or team based at least in part on particular keywords, phrases, or chants recognized in their speech input to the broadcast. In some embodiments, a spectator's detected affiliations or preferences may be added to their profile information. In some embodiments, the spectator's profile information may be modified over time based upon additional analysis of their audio or other inputs.

As another example of applying audio analysis information within a game spectating system, the spectator audio signals for a game or broadcast may be segmented into two or more groups (e.g., fans of particular players or teams), for example based on profile information for the respective spectators or analysis of the spectators' individual audio signals to detect affiliations or preferences, and analyzed separately according to the groups to determine group-specific information about games in the spectating system. For example, the group-specific information may indicate which group of spectators are currently cheering or booing, which group is the loudest and/or quietest, and so on. The group-specific information may be used to provide visual and/or audio feedback to the players and/or spectators in the game spectating system, for example visual and/or audio feedback indicating current levels of excitement in the groups supporting opposing teams. For example, virtual representations of spectators on one side of a stadium or arena in an online sports game may be made to stand up, wave flags, or otherwise visually respond when spectators that are determined to be fans of a particular team and/or player are cheering or booing loudly, for example as illustrated in FIG. 9.

As another example of applying audio analysis information within a game spectating system, spectator audio output may be provided by the game spectating system via audio channel(s) of the broadcast to the spectators, particular groups of the spectators (e.g., to particular fans), and/or to the broadcaster(s) in response to the audio analysis information. For example, when spectators that are determined to be fans of a particular team and/or player are cheering or booing loudly, spectator audio output of the cheers or boos may be provided by the game spectating system to at least some of the spectators (e.g., to the fans of a particular team) via an audio channel of the broadcast. As another example, particularly interesting audio inputs may be detected from individual spectators or groups of spectators (e.g., a particular spectator cheering or chanting loudly, heckling a player, etc.), and spectator audio output of the interesting audio inputs may be provided by the game spectating system via an audio channel of the broadcast. In some embodiments, the spectator audio output may be generated from or as a mix of the spectator audio input(s). In some embodiments, the spectator audio output may be "canned", pre-recorded, or synthesized sounds or sound tracks (e.g., crowd cheers or boos) that are played in response to the audio analysis information.

As another example of applying audio analysis information within a game spectating system, the individual spectator audio signals for a game or broadcast may be analyzed to detect currently interesting spectators, for example particular spectators that are cheering or chanting loudly or heckling a player, or spectators that are particularly happy, angry, or excited. The spectator's interesting audio input may be provided to other participants (spectators and/or broadcasters) by the game spectating system via an audio channel of the broadcast. In addition, in some embodiments, video or images of spectators that are identified as currently interesting based upon their audio input may be provided to the spectators and/or broadcasters, for example in a picture-on-picture window 908 overlaid on the broadcast video as shown in FIG. 9. The video may be video of the interesting spectator(s) captured by video cameras in their spectating environment or simulated video or images of avatars representing the spectator(s) and simulating their detected emotional state.

In some embodiments, spectating system 430 may record at least some of the broadcasts, and the recordings may be made available to spectators for replay. The recordings may include recorded spectator audio as well as the broadcasters'

A/V stream. As another example of applying audio analysis information within a game spectating system, the crowd noise from broadcasts of online games may be analyzed, and the analysis may be used in ranking or recommending recordings of the broadcasts and/or to tag events of interest within the recordings of the broadcasts. In some embodiments, the crowd noise generated during the live broadcasts may be analyzed to determine particular recordings of interest. In some embodiments, the recordings of interest may be indicated on at least some of the spectator devices 420B, for example by highlighting the recordings on the spectating UI. In some embodiments, the crowd noise generated during the live broadcasts may be analyzed to determine particular events of interest within the broadcasts. In some embodiments, the events of interest within a recorded broadcast may be tagged with metadata stored with the recordings, and the events of interest may be indicated on a spectator device 420B when playing back the recording, for example by highlighting the events on a timeline of the recording on the spectating UI. The analysis of the audio information from the broadcasts to determine broadcasts and/or events of interest may be performed during the original live broadcasts, or alternatively may be performed on the recorded or archived broadcast data.

Broadcasts in a game spectating system, and thus recording of the broadcasts, may include multiple games or matches for a given game. For example, a broadcast of an eSports event may include multiple games or matches between players or teams competing in the eSports event. As another example of applying audio analysis information within a game spectating system, the audio analysis information for participants may be leveraged to identify and dag games or matches in recordings of the broadcasts. For example, audio signals for participants may indicate breaks in action at particular times, or other events that may be indicate the start and end of games, matches, and so on. A recording of the broadcast may be tagged with metadata indicating the determined start/stop times of games or matches on the recording. The spectating system UI may then indicate the tagged games or sessions to spectators so that the spectators can select or jump to particular recordings of games, or matches.

In some embodiments, the audio analysis information may be provided to one or more game systems 400 within the game spectating system. The audio analysis information may then be applied within the game system to affect game play within the game systems, for example as described in reference to element 204 of FIG. 2.

As indicated by the arrow returning from element 504 to element 500, in at least some embodiments, the method of FIG. 5 may be an iterative process in which audio input is iteratively obtained, analyzed and applied within the game spectating system while the game spectating system is active.

Figure 6:
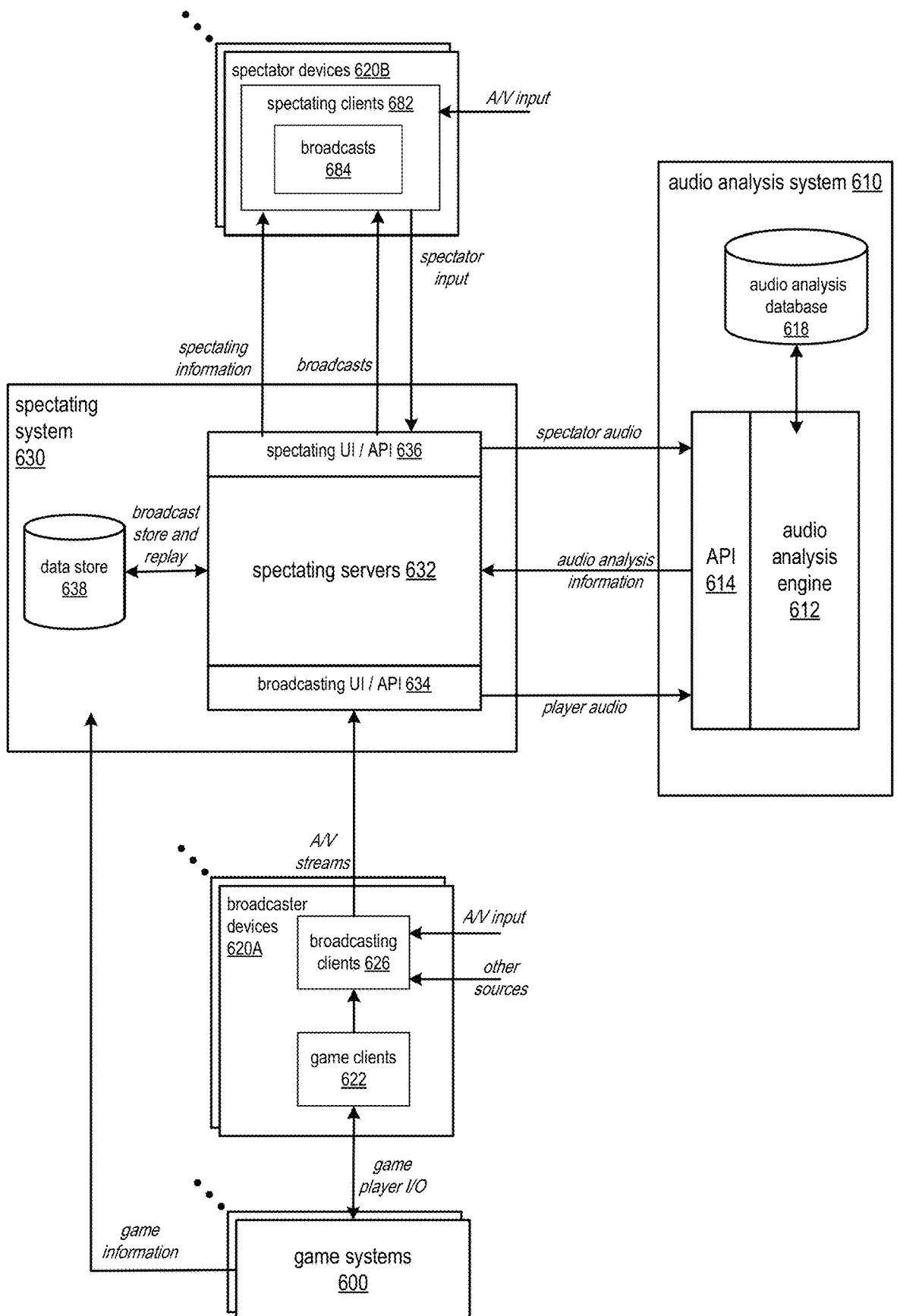
FIG. 6 illustrates an audio analysis module or system that provides analysis of player and/or spectator audio in a game spectating system, according to at least some embodiments.

FIG. 6 illustrates an audio analysis module or system that provides analysis of player and/or spectator audio in a game spectating system, according to at least some embodiments. FIG. 6 shows a game spectating system as illustrated in FIG. 4 in more detail. A game spectating system may include a spectating system 630, one or more game systems 600 that each serve as an execution environment for an online game, and multiple client devices; the client devices may include broadcaster devices 620A and spectator devices 620B. The game spectating system may also include an audio analysis module or system 610.

In at least some embodiments, game spectating system 630 may be a network-based video streaming system that may allow players to broadcast live streams of their online game play to tens, hundreds, or thousands of spectators, while allowing the spectators to select the broadcasts of particular players (also referred to as channels) for viewing via spectating client 682 software on the client devices. A spectating system 630 may support live broadcasts for one, two, or more different game systems 600, and may support live streaming of broadcasts from tens, hundreds, or thousands of broadcaster devices 620A to tens, hundreds, or thousands of spectator devices 620B. In some embodiments, game spectating system 630 may include one or more servers 632 that implement live streaming of broadcasts received from many broadcaster devices 620A to many spectator devices 620B.

In some embodiments, game spectating system 630 may also include other devices including but not limited to storage devices (shown as data store 638) that store data including but not limited to recordings of broadcasts and participant (spectator and broadcaster) information including but not limited participant profile information. Game spectating system 630 may store recordings of at least some broadcasts to a data store 638, and may allow users to select and play back the recordings via spectating client 682 software on the client devices. A game spectating system 630 may also implement one or more user interfaces (UIs) and one or more application programming interfaces (APIs) to the game spectating system functionality. For example, a game spectating system 630 may implement a broadcasting UI/API 634 that broadcasters may access via broadcasting clients 626 to broadcast their live game play and other A/V input as a live stream, and a spectating UI/API 636 that spectators may access via spectating clients 682 to select, receive, and view live broadcasts from the broadcasters or playbacks of previously recorded broadcasts, and via which the spectators may provide spectator feedback (e.g. audio or textual commentary) for broadcasts.

While FIG. 6 shows game systems 600 as separate from spectating system 630, in some embodiments, at least one game system 600 may be implemented at least in part by spectating system 630.

Figure 17:
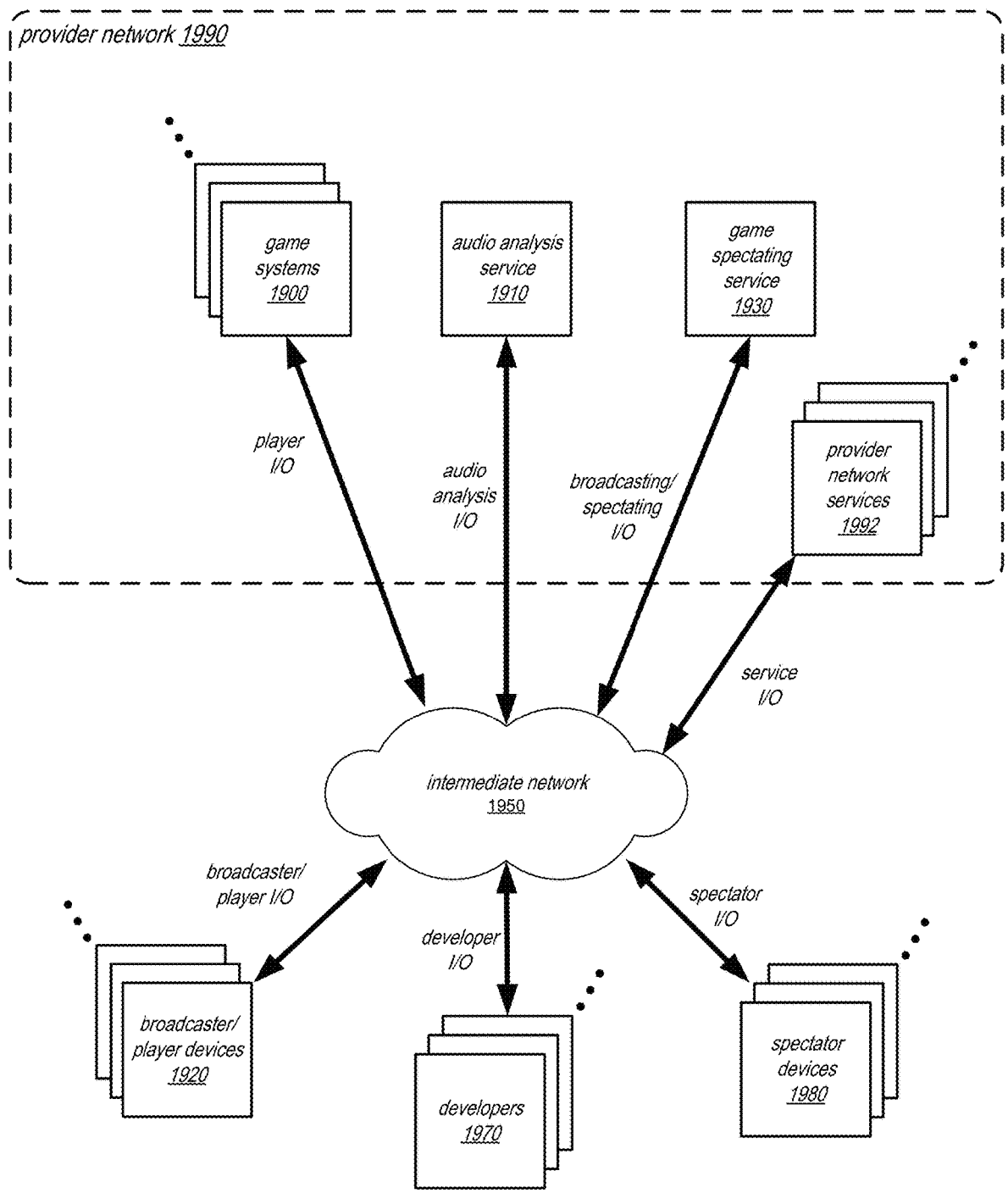
FIG. 17 illustrates an example network-based game and game spectating environment, according to at least some embodiments.

In some embodiments, at least some components of a game spectating system may be implemented in the context of a service provider that provides virtualized resources on a provider network to clients of the service provider, for example as illustrated in FIG. 17. For example, a game spectating system 630 and an audio analysis system 610 may be implemented as services on a provider network as illustrated in FIG. 17, and one or more game systems 600 may be implemented by game providers on the provider network.

A client device 620 may be any of a variety of consumer devices including but not limited to desktop computer systems, laptop/notebook computer systems, pad/tablet devices, smartphone devices, game consoles, handheld gaming devices, and wearable devices. Thus, client devices 620 may range from powerful desktop computers configured as gaming systems down to "thin" mobile devices such as smartphones, pad/tablet devices, and wearable devices. Each client device 620 may implement an operating system (OS) platform that is compatible with the device. A client device may include, but is not limited to, input and output components and client software. The client software on a particular client device 620 may be tailored to support the configuration and capabilities of the particular device type and the OS platform of the device. Each broadcaster device 620A may include, but is not limited to, input and output components and game client 622 software for at least one online game 600 via which respective players can participate in game sessions currently being executed by the game system(s) 600. Each broadcaster device 620A may also include input and output components (e.g., video cameras and microphones) and broadcasting client 626 software for the spectating system 630 via which respective players/broadcasters may generate live A/V streams of their online game play and commentary for broadcasting to spectators via the game spectating system 630. The broadcasters may also receive spectator feedback (e.g., audio and/or textual commentary or chat) from the spectating system 630, for example via the broadcasting client 626 software. Each spectator device 620B may include, but is not limited to, input and output components and spectating client 682 software via which respective spectators may interact with the spectating system 630 to select, receive, and view live or recorded broadcasts 684, and via which the spectators may provide spectator feedback (e.g. audio or textual commentary) to broadcasters. An example computing device that may be used as a client device 620 is illustrated in FIG. 18.

In some embodiments, a game spectating system may also include an audio analysis system 610. In some embodiments, audio analysis system 610 may include one or more computing devices, for example one or more server devices, that implement an audio analysis engine 612 and one or more application programming interfaces (APIs) 614 to the audio analysis functionality. Audio analysis system 610 may also include other devices including but not limited to storage devices that store audio analysis information (shown as audio analysis database 618) for individual participants, groups, crowds, and/or games including but not limited to audio patterns that can be matched or mapped to individual participants' states, group or crowd states, particular game events, and so on. In some embodiments, audio analysis system 610 may be implemented as a separate system from spectating system 630, for example as a network-based service that is accessible by one or more entities including but not limited to spectating system 630. In some embodiments, audio analysis system 610 may instead be implemented as a component, module, or subsystem of spectating system 630. FIGS. 14 and 15 illustrate operations of an example audio analysis system 610, according to at least some embodiments.

In some embodiments, audio analysis system 610 functionality may be implemented in part on client devices 620. For example, in some embodiments, an audio analysis client module may be installed on at least some client devices 620, may locally perform audio analysis for a participant (player/broadcaster or spectator) associated with the client device 620, and may stream or upload the participant audio analysis information to the spectating system 630 and/or audio analysis system 610 for aggregation and analysis with other audio information. FIG. 16 illustrates analysis of audio performed at least in part on client devices in a game spectating system, according to at least some embodiments.

The following is a broad description of an example method for streaming live broadcasts in a game spectating system, and is not intended to be limiting. Typically, a game system 600 renders a 2D or 3D representation of a game universe based on the current state of the universe, generates video and sound, and sends or streams the video and sound (A/V) output to a broadcaster device 620A for processing and/or display by a game client 622. On the broadcaster device 620A, the player/broadcaster uses broadcasting client 626 software and A/V components of the device 620A to construct a live stream for broadcast; the live stream may include the game A/V received from the game system 600, and may also include video and audio input of the player captured by A/V components (e.g., a video camera and microphone) of the device 620A either as a separate stream or embedded in the game A/V stream. The live stream of the broadcast is sent to the spectating system 630 via the broadcasting UI/API 634. On the spectating system 630, one or more servers 632 process the input stream for broadcast to spectator devices 620B. On a spectator device 620B, a spectator may select a particular broadcast or channel for viewing via the spectating client 682. The server(s) 632 may then stream the live broadcast to the spectating client 682 on the respective spectator device 620A via spectating UI/API 636 for display as broadcast 684. The spectator may use spectating client 682 software and A/V components of the device 620B (e.g., a microphone) to provide audio input (e.g., vocal commentary or chat) regarding the current broadcast 684 being viewed.

While the above primarily describes audio input to broadcasts in a game spectating system 630, in some embodiments, spectators and/or broadcasters may also provide other input, for example text input or "chat" using keyboards or other text input devices or interfaces of the respective client devices 620.

As described above, client devices 620 may include audiovisual (A/V) components such as video cameras and microphones that may receive audio (e.g., voice or speech) input from broadcasters and/or spectators during broadcasts. In some embodiments, spectating system 630 may receive broadcaster audio input from broadcaster devices 620A, and may also receive spectator audio input from spectator devices 620B. In some embodiments, the spectating system 630 may receive the audio input via UI/APIs 634 and 636. The audio input may, for example, be received by spectating system 630 as audio tracks in video input, as Voice over IP (VoIP), or according to other network formats or protocols that support digital audio transmission. Spectating system 630 may communicate with the audio analysis system 610 via API 614 to provide spectator and/or player audio to the audio analysis system 610 for analysis and to receive audio analysis information from the audio analysis system 610. The spectating system 630 may then apply the audio analysis information to affect game play and/or game spectating in various ways, for example as described in reference to element 504 of FIG. 5.

In some embodiments, a spectating system 630 may support broadcasts of live and/or recorded digital media content via broadcaster devices 620A from sources other than game systems 600. For example, in some embodiments, the spectating system 630 may support broadcasts of live streams from sports games, competitions, concerts, and other events including but not limited to live streams from electronic spectator sports (eSports) competitions. In these embodiments, audio inputs including but not limited to the spectator audio inputs may be analyzed to determine information about the event being broadcast, and the analysis may be applied in various ways.

While embodiments are primarily described in the context of analyzing and applying audio input in a spectating system 630, it is to be noted that embodiments may also analyze content of other participant input to a spectating system 630, for example text input to a chat 836 user interface element of the spectating system 630 as illustrated in FIG. 8, and may use that analysis alone or in combination with the audio analysis to affect game play and/or game spectating in various ways, for example as described in reference to element 504 of FIG. 5. In addition, some embodiments may also collect and analyze other data from the participants, including but not limited to images of the participants' faces and/or eyes, and may use that analysis alone or in combination with the analysis of the participant audio and/or textual inputs to detect states of participants and to affect an online game and/or spectating system broadcast as described herein.

Figure 7:
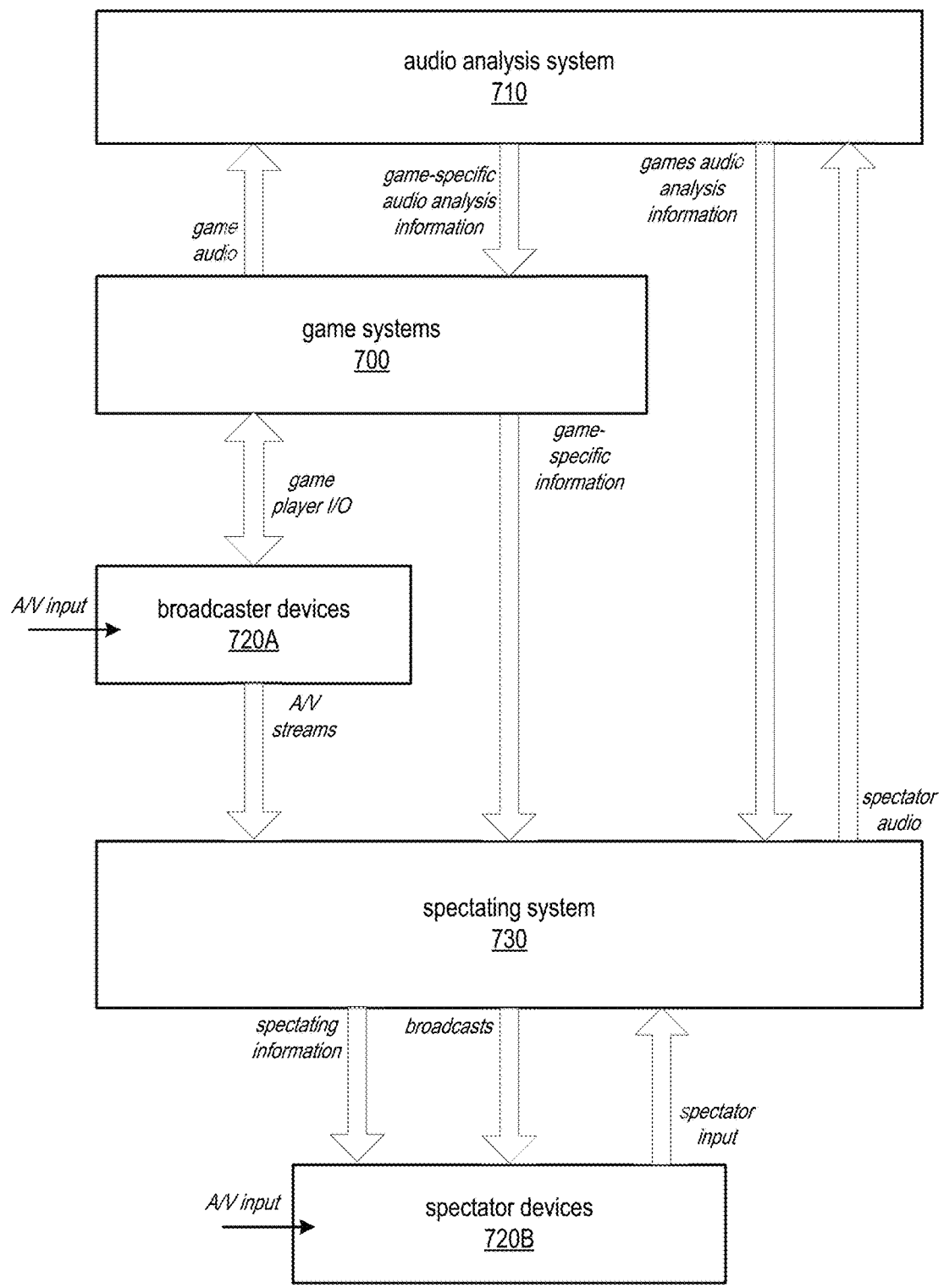
FIG. 7 is a high-level block diagram that illustrates providing analysis of player and/or spectator audio for online games and a game spectating system in an online gaming environment, according to at least some embodiments.

FIG. 7 is a high-level block diagram that illustrates providing analysis of player and/or spectator audio for game systems 700 and a game spectating system 730 in an online gaming environment, according to at least some embodiments. As shown in FIG. 7, in some embodiments, an audio analysis system 710 may be implemented as a network-based service that is accessible by one or more entities including but not limited to game systems 700 and game spectating system 730. Game players may use broadcaster devices 720A to access game systems 700 to play online games; the game systems 700 may access the audio analysis system 710 to analyze and apply in-game audio input from the players, for example as described in reference to FIGS. 1 through 3. In addition, game players may use broadcaster devices 720A to send live streams of their game play to game spectating system 730; game spectators may use spectator devices 720B to select and view the broadcasts, and to provide audio commentary or feedback for the broadcasts to the game spectating system 730. The game spectating system 730 may access the audio analysis system 710 to analyze and apply audio input from the broadcasters and spectators to affect game spectating, for example as described in reference to FIGS. 4 through 6. The audio analysis system 710 may provide game-specific audio analysis information to the game systems 700 and/or to the spectating system, may provide broadcast-specific audio analysis information to the game spectating system 730, and may also provide analysis of aggregated audio information for broadcasts or games to the game spectating system 730.

FIGS. 8 through 10 provide non-limiting examples of user interfaces to a game spectating system, and show several non-limiting examples of various affects that analysis of participant audio may have within a game and game spectating environment.

FIG. 8 provides a non-limiting example of a spectating user interface (UI) to a game spectating system, according to some embodiments. A spectating UI 802 may, for example be presented as a Web page of a game spectating website via a Web browser, as an interface to a game spectating Web application or mobile application, or as an interface to other network-based applications. A spectating UI 802 may include one or more panes or regions including one or more of, but not limited to, controls 810, recommendations 820, current broadcast pane 830, games 850, channels 860, and video on demand 870. Controls 810 may include one or more UI elements for navigating or otherwise interacting with the game spectating system or service. Games 850 may display UI elements 852 corresponding to one or more online games 852 supported by or currently available through the game spectating system. This example shows a racing 852A game, a football 852B game, and a space explorer 852C game. Channels 860 may display UI elements 862 corresponding to one or more currently active (or upcoming) broadcasts or channels 862, for example channels 862 corresponding to broadcasters for a currently selected game 852. In this example, the space explorer 852C game is selected, and channels 862 shows three broadcasters A, B, and C for the currently selected game 852C. Video on demand 870 may, for example, display UI elements 872 corresponding to one or more videos 872, including but not limited to previously recorded broadcasts that are available for viewing. In this example, video on demand 870 shows example pre-recorded videos 872 for the currently selected game 852C. Recommendations 820 may display UI elements corresponding to one or more of recommended games 852, channels 862 (broadcasters), and recorded videos 872.

In some embodiments, content of recommendations 820, channels 860, and/or video on demand 870 may be determined at least in part according to a currently selected game 852. For example, in some embodiments, a spectator may select a game 852C to view the currently active channels 862 for the selected game 852, and to view recordings of broadcasts for the selected game 852. While not shown, in some embodiments, the UI 802 may allow the spectator to select particular broadcasters, and the content of recommendations 820, channels 860, and/or video on demand 870 may be determined at least in part according to the currently selected broadcaster.

Current broadcast pane 830 may include a video player 832 that displays the video stream for a currently selected live broadcast or channel 862 (in this example, channel 862A), or a currently selected video 872 being played to the respective spectator device. The video stream may include game play video, for example shown from the broadcaster/player's viewpoint or perspective or from a bird's eye view, and a window showing a live view of the broadcaster/player, in this example broadcaster/player A. The video player 832 typically also plays the mixed audio stream including the game audio, the broadcaster audio, and the audio commentary or "crowd noise" from the spectators. In some embodiments, the audio may also include commentary or play-by-play calls from a commentator. In some embodiments, current broadcast pane 830 may also include a chat 836 pane in which broadcaster and/or spectator text chat may be displayed. In some embodiments, current broadcast pane 830 may also include one or more UI elements 834 via which audio analysis feedback information may be displayed.

As mentioned above in reference to element 504 of FIG. 5, the spectating system may apply audio analysis information to affect game spectating in various ways. The following provides several examples of applying audio analysis information within a game spectating user interface (UI). However, note that these examples are not intended to be limiting.

As an example, referring to FIG. 8, the audio analysis information may be used to determine currently active or popular games 852, channels 862, and/or recorded videos 872. The active or popular items may, for example, be included as recommendations 822 in the recommendations 820 pane. This example shows the space explorers 852C game, broadcaster A 862A channel, and a "broadcaster A vs. broadcaster B" 872 game session recording from game 852C in the recommendations 820 pane. Instead or in addition, active or popular items may be highlighted, ranked, or otherwise indicated in the respective panes 850, 860, and/or 870. In some embodiments, a spectator may select a recommended or highlighted game 852 to view current channels 862 for the game, or select a highlighted channel 862 or recorded video 872 for viewing in current broadcast pane 830.

As another example, the audio analysis information for spectators of one or more broadcasts 862 of a particular online game 852 and/or of one or more broadcasters/players of the game 852 may be leveraged to identify an emotion or emotional state or other information for one or more particular players within a game world of the online game 852 being broadcast, and this information may be provided to the game system and visually indicated to the spectators and/or broadcasters/players in the game video. For example, as shown in FIG. 8, player E's character has been highlighted to visually indicate an emotion or emotional state of the player based upon analysis of the player's audio input.

As another example, the audio analysis information for spectators of one or more broadcasts 862 of a particular online game 852 and/or of one or more broadcasters/players of the game 852 may be leveraged to identify particular players, teams, locations, areas, or regions within a game world of the online game 852 being broadcast for which activity is "hot". In some embodiments, a world map 836 or portion of a map of the online game 862 world may be displayed on at least some of the spectator devices, for example as an audio analysis feedback 834 UI element, and players, teams, areas, regions, or locations that have been identified as active within the game according to analysis of the audio signals may be marked or highlighted or otherwise visually indicated on the map 836. In some embodiments, a spectator may then select an indicated player, team, or area via the UI element 834 to view associated current channels 862 for the game 852, and may select a channel 862 for viewing in current broadcast pane 830. In the example shown in FIG. 8, the Alpha Team region on the map 836 has been highlighted based upon analysis of audio input from the players on the team and/or from the spectators viewing the team via one or more broadcasts.

As another example, spectator audio signals for a game or broadcast may be segmented into two or more groups (e.g., fans of particular players or teams) and analyzed separately according to the groups to determine group-specific information about games or broadcasts in the spectating system. The group-specific information may be provided to the online game 852 and used to provide visual feedback to spectators via the spectating UI 802, for example visual feedback in the video player 832 indicating current levels of excitement in the groups supporting opposing teams.

Note that the content of the spectating UI 802 may vary for different spectators, for example based upon profile, preference and/or UI options and configuration information for the individual spectators or group profile information for groups of spectators. For example the types of games 850 that are displayed may vary based upon a spectator's profile or preferences. As another example, content of one or more of the UI elements may be different for fans of different teams or players.

FIG. 9 provides a non-limiting example of a spectating user interface 902 for a game spectating system on a device 900 in which spectators' audio input results in visual and/or audio indications of the spectators' state or excitement level. As shown in FIG. 9, a spectator's device 900 may implement a spectating UI 902, and may include a microphone 906 to collect spectator 920 audio and speakers 904 to output game audio (including spectator audio and/or crowd noise, broadcaster commentary, etc.). In some embodiments, virtual representations 922 of spectators (e.g., the spectators' avatars) may be divided into two or more groups (e.g., fans of particular players or teams, in this example fans of teams A and B), for example based on profile information for the respective spectators 920 or analysis of the spectators' individual audio signals to detect the spectators' affiliations or preferences. As shown in the example of FIG. 9, the virtual representations 922 of spectators on one side of a football stadium or basketball arena in an online sports game (team B fans, in this example) may be made to stand up, wave flags, or otherwise visually respond when the spectators 920 who are fans of a particular team and/or player are audibly cheering or booing loudly.

Instead of or in addition to the visual indications, spectator audio output indicating sounds or noises generated by the spectators or by particular groups of the spectators may be provided to the spectators 920 via the spectators' devices 900 by the game spectating system in response to analysis of the spectators' audio input via the devices 900. For example, when spectators that are determined to be fans of a particular team and/or player are cheering or booing loudly, spectator audio output including the cheers or boos may be provided by the game spectating system via an audio channel of the broadcast to the spectators or to particular groups of the spectators. As another example, particularly interesting audio inputs may be detected from individual spectators or groups of spectators (e.g., a particular spectator cheering or chanting loudly), and spectator audio output of the interesting audio inputs may be provided by the game spectating system via an audio channel of the broadcast. In some embodiments, the spectator audio output may be generated from or as a mix of the spectator audio input(s). In some embodiments, the spectator audio output may be "canned", pre-recorded, or synthesized sounds or sound tracks (e.g., crowd cheers or boos) that are played in response to the audio analysis information.

In addition to providing audio output from interesting spectator audio inputs, in some embodiments, video or images of one or more spectators that are identified as currently interesting based upon their current audio input may be provided to spectators and/or broadcasters, for example in a picture-on-picture window 908 overlaid on the broadcast video in the spectator UI 902 as shown in FIG. 9. The video may be video of the interesting spectator(s) captured by video cameras in their spectating environment or simulated video or images of avatars representing the spectator(s) and simulating their detected emotional state.

Note that the content of the spectating UI 902 may vary for different spectators 920, for example based upon profile, preference and/or UI options and configuration information for the individual spectators 920 or group profile information for groups of spectators 920. For example, the view of the game displayed in UI 902 may vary based upon a spectator 920's team affiliation. As another example, window 908 may show different interesting spectators to fans of different teams. In addition, the audio output by the game spectating system, for example via device 900, may vary for different spectators 920 based upon profile, preference and/or UI options and configuration information for the individual spectators 920 or group profile information for groups of spectators 920. For example, in the example of FIG. 9, fans of team A may hear different crowd noise than fans of team B. As another example, different interesting audio outputs from individual spectators or groups of spectators may be output based upon a spectator's preferences or affiliations.

In some embodiments, the spectating UI 902 may allow a spectator 920 to select particular spectators 920 to hear their current audio input and/or to view video of the spectators 920 via a picture-on-picture window 908, for example by clicking on a spectator's avatar displayed on the UI 902. In some embodiments, the spectating UI 902 may allow a spectator 920 to select particular players in the game being viewed to hear their current audio input and/or to view video of the players in the game via a picture-on-picture window 908, for example by clicking on a player's avatar or character displayed on the UI 902.

FIG. 10 provides a non-limiting example of a broadcaster user interface for a game spectating system, according to some embodiments. A broadcaster's device 1000 may implement a game and broadcasting UI 1002, and may include an A/V device 1008 (e.g., a video camera) to collect broadcaster/player 1020 audio and video input and speakers 1004 to output game audio (including spectator audio and/or crowd noise.).

In some embodiments, a world map 1012 or portion of a map of the online game world may be displayed on UI 1002, for example as a window within or overlaying the game play window, and players, teams, areas, regions, or locations that have been identified as active within the game according to analysis of the audio signals may be marked or highlighted or otherwise visually indicated on the map 1012. In the non-limiting example shown in FIG. 10, a region 1014 has been highlighted on the map 1012 based upon analysis of audio input from the game players and/or from the spectators watching broadcasts of the game. Broadcaster/player A's team location is shown by the oval marked with an X. Broadcaster/player A and his team may, in some cases, take action based upon the visual indication of activity in region 1014.

In some embodiments, an audience tracking 1010 pane may be displayed on UI 1002. The audience tracking 1010 may provide information and feedback to the broadcaster/player 1020 based on the analysis of the audio signals collected from the spectators of the broadcaster/player 1020 (broadcaster/player A, in this example). In the non-limiting example shown in FIG. 10, audience tracking 1010 pane includes a count of broadcaster/player A's spectators, provides a visual indication of the current noise level of the spectators, and shows a graph of the spectators' noise level over time. In some embodiments, audio analysis information for one or more other broadcasters/players may also be provided so that a broadcaster/player can compare their audience response to that of other players.

In some embodiments, instead of or in addition to the visual indications as described above, spectator audio output, for example output indicating the "crowd noise" or other sounds generated by the spectators or by particular groups of the spectators, may be provided to the broadcaster 1020 via device 1000 by the game spectating system in response to analysis of spectators' audio inputs. For example, when spectators that are determined to be fans of a particular team and/or player are cheering or booing loudly, spectator audio output including the cheers or boos may be provided by the game spectating system via an audio channel to the broadcaster's device 1000. In some embodiments, the spectator audio output may be generated from or as a mix of the spectator audio input(s). In some embodiments, the spectator audio output may be "canned", pre-recorded, or synthesized sounds or sound tracks (e.g., crowd cheers or boos) that are played in response to the audio analysis information.

Analysis of Participant Audio Input in Online Gaming Environments

This section describes methods of analyzing participant audio input by an audio analysis system in online gaming environments, for example to determine events in online games, according to some embodiments. Participants in online gaming environments (e.g., online game systems as illustrated in FIGS. 1 through 3 or game spectating systems as illustrated in FIGS. 4 through 8) may include spectators and players/broadcasters. In some embodiments, player/broadcaster audio may be analyzed by an audio analysis system to determine events or states within an online game. In some embodiments, spectator audio may be analyzed by an audio analysis system to determine events or states within an online game. In some embodiments, player/broadcaster and spectator audio may both be analyzed, and the combined analysis information may be used to determine events or states within an online game.

Figure 11:
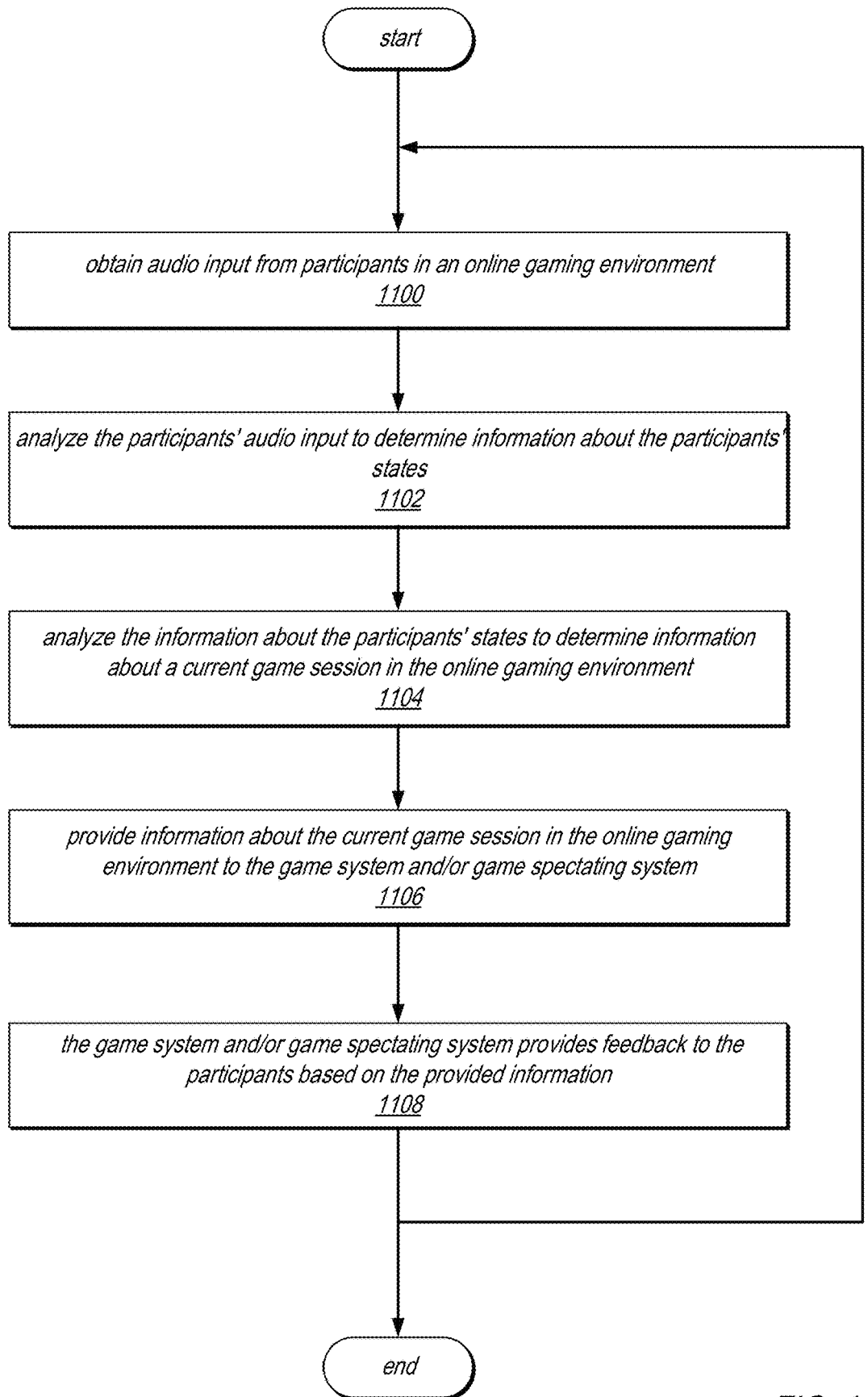
FIG. 11 is a flowchart of a method for analyzing participant audio to determine information about game sessions in an online gaming environment, according to at least some embodiments.

FIG. 11 is a flowchart of a method for analyzing participant audio to determine information about game sessions in an online gaming environment, according to at least some embodiments. The method of FIG. 11 may, for example, be implemented by an audio analysis system for an online game as illustrated in FIGS. 1 through 3 or by an audio analysis system in a game spectating system as illustrated in FIGS. 4 through 10.

As indicated at 1100 of FIG. 11, audio input may be obtained by the audio analysis system from participants in an online gaming environment. The audio input may, for example, be obtained from spectators and/or players of an online game, for example as described in reference to element 200 of FIG. 2. The audio input from an online game may include in-game voice chat and communications of the game players, and may also include comments, chat, and other vocalizations of the players and/or spectators. As another example, audio input may be obtained from broadcasters and/or spectators in a game spectating system, for example as described in reference to element 500 of FIG. 5. Note that the broadcasters may be participating as players in, and commenting on, online games. The audio input for a broadcast channel in a game spectating system may include in-game voice chat and communications of the game players, and may also include comments, chat, and other vocalizations of the broadcasters and/or spectators. In some embodiments, the audio input may also include commentary provided by a commentator for an online game.

As indicated at 1102 of FIG. 11, the participants' audio input may be analyzed by the audio analysis system to determine information about the participants' states. The audio signals may be analyzed, for example by comparing the signals to known or learned audio signal patterns for the individual participants to determine information about the participants. In some embodiments, the audio analysis system may perform signal analysis, for example time- and frequency-domain analysis, on the participants' audio signals to determine one or more audio signal metrics (voice and/or speech metrics) from the audio signals. FIG. 14 illustrates processing audio signals to generate information in an audio analysis system, according to at least some embodiments. The metrics may, for example, include one or more of amplitude, pitch, duration, and frequency metrics, and in general any relevant metric that can be extracted from an audio or voice signal. The participants' audio signal metrics (voice and/or speech metrics) may be compared to known or learned audio content patterns for individual participants or groups of participants according to one or more emotion recognition and speech recognition techniques to determine information about the participants or groups. In some embodiments, the determined information may, for example, indicate an emotion or emotional state or states (e.g., excitement, stress, fear, shock, surprise, amusement, anger, sadness, happiness, frustration, etc.) of individual players and/or spectators based on the analysis of the participants' vocalizations, speech, or other sounds in the respective audio signals. In some embodiments, the information may also indicate a level for a determined state, for example an indication of how excited a participant appears to be when compared to a threshold or average for individual participants.

In some embodiments, the audio signal metrics for game players may be analyzed, for example by comparing the metrics to known or learned audio content patterns for individual players and/or groups or teams of players in an online game according to one or more emotion recognition and speech recognition techniques, to determine information about the players, groups of players, and/or the game session. In some embodiments, the audio signal metrics for game spectators may be analyzed, for example by comparing the metrics to known or learned audio content patterns for spectators, groups, or crowds of an online game according to one or more emotion recognition and speech recognition techniques, to determine information about the spectators, the game players, and/or the game session.

As indicated at 1104 of FIG. 11, the information about the participants' states may be analyzed by the audio analysis system to determine information about a current game session in the game spectating system. In some embodiments, the participants' audio signals may be individually analyzed to determine voice and/or speech metrics for each participant's audio input, and the metrics may then be aggregated and analyzed according to one or more emotion recognition and speech recognition techniques to determine information about groups of players and/or groups or crowds of spectators. In some embodiments, instead of or in addition to separately analyzing the audio signals and then aggregating the metrics for further analysis, the audio signals may be aggregated or combined and analyzed collectively to generate metrics for and information about groups of players and/or groups or crowds of spectators.

In some embodiments, the information determined from analysis of the participants' individual audio signals may be normalized, aggregated, and used to determine a state or states for groups of participants (e.g., excitement, stress, approval, disapproval, etc.) based on an analysis of the aggregated information for the participants in the group. The aggregated information may, for example, be compared to known or learned voice, emotion, and/or speech patterns for groups of participants in an online game to determine information about the online game. In some embodiments, the information may also indicate a level for a determined state, for example an indication of how excited a group of participants appears to be when compared to a threshold or average for groups of participants.

In some embodiments, the determined information for game players may, for example, indicate an emotion or emotional state or states (e.g., excitement, stress, fear, shock, surprise, amusement, anger, sadness, happiness, frustration, etc.) of individual players based on the analysis of the individual players' vocalizations or other sounds in the respective audio signals. In some embodiments, the determined information may instead or also indicate a state or states for a group or team of players (e.g., excitement, stress, approval, disapproval, etc.) based on an analysis of the combined audio signal metrics for two or more players. In some embodiments, the information may also indicate a level for a determined state, for example an indication of how excited a team of players appears to be based on an analysis of aggregated player audio input for the team.

In some embodiments, the determined information may, for example, indicate an emotion or emotional state or states (e.g., excitement, stress, fear, shock, surprise, amusement, anger, sadness, happiness, frustration, etc.) of individual spectators based on the analysis of the individual spectators' vocalizations or other sounds in the respective audio signals. In some embodiments, the determined information may instead or also indicate a state or states for a group or crowd of spectators (e.g., excitement, stress, approval, disapproval, etc.) based on the analysis of the combined audio signal metrics for two or more spectators. In some embodiments, the information may also indicate a level for a determined state, for example an indication of how excited a crowd of spectators appears to be based on an analysis of aggregated spectator audio input.

In some embodiments, the determined information may indicate particular events in an online game session. For example, in some embodiments, at least some of the audio content patterns to which the audio signal metrics are matched may be mapped to particular types of events in the respective online game. For example, in a sports game, particular player and/or spectator audio patterns may be mapped to big plays, such as scoring plays or great defensive plays. In some embodiments, the information may anticipate or predict a potential upcoming event in an online game session. For example, in a sports game, particular player and/or spectator audio patterns may be mapped to what typically happens prior to a particular play or other event, for example particular vocalizations used to signal other team members prior to a play. As another example, particular spectator audio patterns may be mapped to what typically happens prior to a particular big event, such as crowd silence or chanting before an important offensive play in a football game, or very low crowd noise before a big defensive play in a football game. In some embodiments, the information may also indicate locations and times within the game universe for particular events to which the analyzed audio signals are mapped. For example, analysis of aggregated player and/or spectator audio signals and correlated metadata may indicate a particular location or area in the online game universe, and/or a particular time within the game timeline, at which important or exciting events happen.

In some embodiments, at least some of the participants' spoken words or phrases may be identified (e.g., using speech recognition technology) and analyzed, alone or in combination with other voice analysis metrics determined for the participants, to determine information (e.g., particular game events) for the respective content (e.g., game). For example, particular words or phrases, or keywords and key phrases, used by a broadcaster, commentator, or spectator(s) may be mapped to particular game events, game players, and so on, and may be used to provide visual or other feedback to spectators and/or players of the game being commented on, or to tag recordings of the video content with metadata identifying the particular events. As another example, particular voice inflections or intonations of participants may be identified and mapped to particular game events or situations (e.g., tense moments before big plays), and this information may be used to provide feedback to participants, to tag recordings, and so on.

As indicated at 1106 of FIG. 11, the audio analysis system may provide the information about the current game session in the online gaming environment to the game system and/or game spectating system. The current information may, for example, be provided to a game system as illustrated in FIGS. 1 through 3, or to game system(s) in a game spectating system as illustrated in FIGS. 4 through 10. Instead or in addition, the current information may be provided to a game spectating system in a game spectating system as illustrated in FIGS. 4 through 10.

As indicated at 1108 of FIG. 11, a game system and/or game spectating system may provide feedback to the participants (players and/or spectators) based on the provided information. The feedback may include, but is not limited to, visual feedback. For example, an online game may use the provided information to provide visual or other feedback to players and/or spectators or to otherwise affect game play, for example as described in reference to element 204 of FIG.

2. Instead or in addition, the current information may be provided to a game spectating system in a game spectating system as illustrated in FIGS. 4 through 10. The game spectating system may then use the provided information to provide visual or other feedback to broadcasters and/or spectators or to otherwise affect the game spectating system, for example as described in reference to element 504 of FIG. 5.

As indicated by the arrow returning from element 1108 to element 1100 in FIG. 11, in at least some embodiments, the method of FIG. 11 may be an iterative process in which audio input is iteratively obtained, analyzed, and applied within an online gaming environment. For example, the method of FIG. 11 may be an iterative process in which audio input for an online game and/or broadcast is iteratively obtained, analyzed and applied within an online gaming environment while the online game and/or broadcast is active. Note that a game spectating system may concurrently stream multiple broadcasts to spectators via multiple broadcast channels, with each broadcast channel corresponding to a particular broadcaster. The method of FIG. 11 may be applied to each broadcast channel in the game spectating system.

Commentator Audio Analysis

In some embodiments, in addition to players and spectators, participants in an online gaming environment may include commentators. A commentator may be a spectator that watches live or recorded game play without directly participating in the game. However, instead of just contributing to "crowd noise", a commentator may generally be someone that is knowledgeable about the game and that provides audio commentary on the game being watched, for example game analysis, player analysis, and play-by-play commentary. One or more commentators may provide audio commentary for a given game being broadcast in a spectating system. In some embodiments, commentator audio may be added to an A/V input stream being broadcast to spectators, and may be provided to the spectators in the environment as a separate audio channel. In some embodiments, instead of or in addition to analyzing player and/or spectator audio, commentator audio may be analyzed to determine information about a game being broadcast, and the analysis of the commentator audio may be applied in the game spectating system in various ways.

In some embodiments, the game commentator audio input may be provided to an audio analysis system, for example as illustrated in FIG. 14. The audio analysis system may analyze the commentator audio input to determine information about the video content (e.g., game) being commented on. In some embodiments, the audio analysis system may perform signal analysis on a commentator's audio signal to determine one or more metrics from the audio signal. The metrics may, for example, include one or more of amplitude, pitch, duration, and frequency metrics, and in general any relevant voice analysis metric that can be extracted from an audio or voice signal. The audio signal metrics may be analyzed, for example by comparing the metrics to known or learned audio patterns for the commentator, to help determine information about the commentator(s) and/or video content (e.g., game) being commented on. In addition, since commentators may typically be knowledgeable about the content (e.g., game) that they are commenting on, at least some of a commentator's spoken words or phrases may be identified (e.g., using speech recognition technology) and analyzed, alone or in combination with the voice analysis metrics determined for the commentator, to determine information (e.g., particular game events) for the respective content (e.g., game). For example, particular words or phrases used by a commentator may be mapped to particular game events, game players, and so on, and may be used to provide visual or other feedback to spectators and/or players of the game being commented on, or to tag recordings of the video content with metadata identifying the particular events. As another example, particular voice inflections or intonations of a commentator may be identified and mapped to particular game events or situations (e.g., tense moments before big plays), and this information may be used to provide feedback to participants, to tag recordings, and so on.

The commentator audio analysis information may, for example, be provided to an online game system as illustrated in FIGS. 1 through 3 or to a game system in a game spectating system as illustrated in FIGS. 4 through 10. Instead or in addition, the current information may be provided to a game spectating system in a game spectating system as illustrated in FIGS. 4 through 10. An online game may use the provided information to provide visual or other feedback to players and/or spectators or to otherwise affect game play, for example as described in reference to element 204 of FIG. 2. Instead or in addition, the current information may be provided to a game spectating system in a game spectating system as illustrated in FIGS. 4 through 10. The game spectating system may then use the provided information to provide visual or other feedback to broadcasters and/or spectators or to otherwise affect the game spectating system, for example as described in reference to element 504 of FIG. 5.

Determining and Presenting Broadcast Highlights

In some embodiments, player and/or spectator audio may be analyzed to determine interesting or notable events ("highlights") in the broadcasts and/or games executing on the game systems. Highlight segments may be extracted from the broadcasts according to the highlight data. In some embodiments, each highlight segment includes an interesting or notable event from a respective game or broadcast as determined according to the highlight data for the game. In some embodiments, sets or "reels" of highlights may be determined according to one or more highlight selection criteria such as game genres, game titles, player/broadcasters, time periods, spectator voting, and so on. The highlights may be presented to participants via respective participant devices. In some embodiments, the participants may selectively view the highlights and/or highlight reels via a highlight user interface (UI).

FIG. 12 is a high-level flowchart of an example method for determining and presenting highlights for a broadcast in a game spectating environment, according to at least some embodiments. The method of FIG. 12 may, for example, be implemented by an audio analysis system for an online game as illustrated in FIGS. 1 through 3 or by an audio analysis system in a game spectating system as illustrated in FIGS. 4 through 10. In some embodiments, at least part of the method of FIG. 12 may be implemented by a highlight service in a network-based game and/or game spectating environment, for example as illustrated in FIG. 17.

As indicated at 1200 of FIG. 12, audio input may be obtained for a broadcast in a game spectating environment. Referring to FIG. 4, spectating system 430 may receive broadcasts of players' game play from broadcaster devices 420A and stream the broadcasts to spectator devices 420B for viewing by respective spectators. Each broadcast includes video showing game play of a respective broadcaster participating as a player in a game executing on a game system 400, and may also include audio (e.g., voice or speech) input from players and/or spectators during the broadcast.

As indicated at 1210 of FIG. 12, the audio inputs may be processed to determine highlight segments from the broadcasts. Referring to FIG. 4, in some embodiments, the spectating system 430 may provide the received audio input to an audio analysis system 410. The audio analysis system 410 may perform signal analysis, for example time- and frequency-domain analysis, on the audio signals to determine one or more metrics from the audio signals. The metrics may, for example, include one or more of amplitude, pitch, duration, and frequency metrics, and in general any relevant metric that can be extracted from an audio or voice signal. The audio signal metrics may be analyzed, for example by comparing the metrics to known or learned audio patterns for individual participants or groups of participants, to determine information about the participants and/or the broadcasts. In some embodiments, the determined information may indicate highlight events in a broadcast or game session being streamed. For example, in a sports game, particular crowd (spectator) and/or player audio patterns may be mapped to big plays, such as scoring plays or great defensive plays. As another example, in a MOBA or MMOG game, particular spectator and/or player audio patterns may indicate big fights or battles. In some embodiments, in addition to determining highlights that show interesting or notable events from broadcasts, spectator and/or player audio inputs may be analyzed to generate information that anticipates or predicts potential upcoming highlight events in game sessions or broadcasts. For example, in a sports game, particular crowd (spectator) and/or player audio patterns may be mapped to what typically happens prior to a particular big event, such as crowd silence or chanting before an important offensive play in a football game, or very low crowd noise before a big defensive play in a football game.

As indicated at 1220 of FIG. 12, the highlights may be presented to participants via a user interface. Referring to FIG. 4, in some embodiments, access to the highlights may be provided via a highlight user interface (UI) presented to the participants on respective client devices 420. In some embodiments, spectators may selectively view specific highlights via the highlight UI. In some embodiments, particular sets or "reels" of highlights (e.g., highlights from particular genres, games, etc.) may be provided to the spectators via the highlight UI based on the spectators' specified or otherwise determined highlight viewing preferences.

FIG. 13 provides a non-limiting example of a highlight user interface for a game spectating system, according to some embodiments. A highlight UI 1302 may, for example be presented as a Web page of a game spectating website via a Web browser, as an interface to a game spectating Web application or mobile application, or as an interface to other network-based applications. A highlight UI 1302 may include one or more panes or regions including one or more of, but not limited to, controls 1310 and a highlight pane 1340 via which a spectator may select and view highlights. Controls 1310 may include one or more UI elements for navigating or otherwise interacting with the game spectating system or service. Highlight pane 1340 may include a current highlight 1342 pane that displays highlights, for example highlights from a currently selected highlight reel 1348, or highlights from a current broadcast.

Highlight pane 1340 may also include a highlight info/controls 1344 pane that may display information about the current highlight 1342. Highlight info/controls 1344 pane may also include one or more UI elements via which a spectator can control the current highlight 1342 display, for example pause/resume, volume, and forward/backward controls. In some embodiments, highlight info/controls 1344 pane may also include one or more UI elements via which a spectator may vote (e.g., with an up or down vote) on a current highlight 1342.

In some embodiments, highlight pane 1340 may also include a highlight filter/preferences pane 1344 that may include one or more UI elements via which a spectator may specify their highlight viewing preferences, for example by selecting genres, games, broadcasters/players, and/or time frames of interest to the spectator. In some embodiments, highlight pane 1340 may include an available highlights 1346 pane that may display one or more available highlights or highlight reels 1348, for example highlights 1348 determined according to the spectators' current preferences 1344, or highlights automatically selected from a current broadcast.

Audio Analysis System Details

FIG. 14 is a high-level illustration of processing audio signals to generate information in an audio analysis system, according to at least some embodiments. The audio analysis system 1410 may, for example, be implemented in an online game system as illustrated in FIGS. 1 through 3 or in a game spectating system as illustrated in FIGS. 4 through 10. Audio analysis system 1410 may receive audio signals from client devices 1420. Client devices 1420 may include player, broadcaster, spectator, and/or commentator devices as illustrated in FIGS. 1 through 13.

In at least some embodiments, an audio analysis system 1410 may include, but is not limited to, an audio signal processing 1430 component or module, an emotion recognition 1440 component or module, a speech recognition 1450 component or module, and an audio content analysis 1460 component or module. The audio analysis system 1410 may also include or have access to audio analysis data 1418.

In at least some embodiments, audio signal processing 1430 component may perform signal analysis, for example time- and frequency-domain analysis, on the audio input signals to determine and extract voice and/or speech metrics from the audio input signals according to one or more audio models maintained in audio analysis data 1418. The metrics may, for example, include one or more of amplitude, pitch, duration, and frequency metrics for individual participants and/or for groups of participants, and in general any relevant metric that can be extracted from an audio input signal or collection of audio input signals. In some embodiments, audio signal processing 1430 component may output voice metrics to emotion recognition 1440 component, and speech metrics to speech recognition 1450 component.

In at least some embodiments, emotion recognition 1440 component may apply an emotion recognition technique. In at least some embodiments, the emotion recognition technique may be a statistical pattern recognition technique that compares the voice metrics to known or learned voice patterns for individual participants or groups of participants according to one or more emotion models maintained in audio analysis data 1418 to determine emotions or emotional states (e.g., excitement, stress, fear, shock, surprise, amusement, anger, sadness, happiness, frustration, etc.) for participants or groups of participants from the participants' vocal patterns. In various embodiments, for example, a Maximum Likelihood Bayes classifier (MLB), Kernel Regression (KR), or K-nearest neighbors (KNN) statistical pattern recognition technique may be used. Note, however, that other types of emotion recognition techniques may be used. In at least some embodiments, emotion recognition 1440 component may output the detected emotions to audio content analysis 1460 component.

In at least some embodiments, speech recognition 1450 component may apply a speech recognition technique. In at least some embodiments, the speech recognition technique may be a pattern recognition technique that compares the speech metrics to known or learned speech patterns for individual participants or groups of participants according to one or more speech models maintained in audio analysis data 1418 to detect and extract speech (e.g., words and phrases, keywords, key phrases, etc.) from the audio input signals according to the participants' speech patterns. In some embodiments, for example, a stochastic modeling technique such as a hidden Markov modeling (HMM) technique may be used. Note, however, that other types of pattern recognition techniques, or other classes of speech recognition techniques, may be used. In at least some embodiments, speech recognition 1450 component may output the detected speech to audio content analysis 1460 component.

In at least some embodiments, audio content analysis 1460 component may map the detected emotions and/or speech (referred to collectively as audio content) to known or learned audio content patterns maintained in audio analysis data 1418 to determine information about participants, games, and/or broadcasts from the extracted content of the audio input signals. The audio content patterns may include, but are not limited to, emotion patterns corresponding to particular emotions or emotional states for individuals, groups, and crowds in online gaming environments, and speech patterns (e.g., keywords or word patterns) corresponding to emotions, game events, and so on in online gaming environments. The determined information may include one or more of, but is not limited to: information identifying current emotions or emotional states for particular participants or groups of participants (players, teams of players, broadcasters, and/or spectators); information identifying hotspots in games; information identifying particular players or teams of players of interest (e.g., "hot" teams or "hot" players) in games; information identifying active or popular players/teams, broadcasters, games, and/or broadcasts; information identifying highlights from games or broadcasts; information identifying particular events in games and/or broadcasts; and in general any information that can be determined for participants, games, and/or broadcasts from audio input signals as described herein.

In some embodiments, at least some of the audio content patterns may be generic to players, games and/or broadcasts, and the audio content may, for example, be mapped to general events or general types of events in games and/or broadcasts according to the patterns. In some embodiments, at least some of the audio content patterns may be specific to particular online games, and the audio content may, for example, be mapped to particular events or types of events within the online games according to the game-specific patterns. The audio analysis system 1410 may output the audio analysis information generated by the audio content analysis 1460 component to one or more game and/or spectating systems 1400. The audio analysis information may, for example, be provided to an online game in an online game system as illustrated in FIGS. 1 through 3 or to game system in a game spectating system as illustrated in FIGS. 4 through 10. The online game system may then use the provided audio analysis information to affect game play, for example as described in reference to element 204 of FIG. 2. Instead or in addition, the audio analysis information may be provided to a game spectating system in a game spectating system as illustrated in FIGS. 4 through 10. The game spectating system may then use the provided audio analysis information to affect the game spectating system, for example as described in reference to element 504 of FIG. 5.

In some embodiments, instead of or in addition to the audio analysis information determined from the detected emotions and/or detected speech, the audio analysis system 1410 may provide at least some of the detected emotions and/or detected speech to a game and/or spectating system 1400 for application within the game and/or spectating system 1400.

As described above, embodiments may maintain audio models, emotion models, speech models, and audio content patterns as audio analysis data 1418, and may access the audio analysis data 1418 when processing the audio signals, performing emotion and speech recognition, and mapping detected audio content to audio content patterns. Some embodiments may use speaker-independent voice and speech recognition techniques that are designed to generally recognize anyone's voice and speech (words and phrases). However, some embodiments may use speaker-dependent voice and speech recognition techniques. In either case, the data sets and models may be initialized or trained, and voice, speech, and emotion patterns for individuals or groups may be learned or improved over time.

In some embodiments, the audio analysis system 1410 may use feedback and machine learning techniques to train and improve the data sets used in extracting voice and speech metrics from audio input, recognizing emotions and speech from the extracted metrics, and mapping the emotions and speech to audio content patters. For example, in embodiments that use speaker-independent voice and speech recognition techniques, the data sets may be initialized by collecting a corpus of speech examples from many individuals and developing statistical models from the corpus of examples. The data sets may be improved over time, for example by adding new samples obtained during usage to the statistical model, or by receiving feedback from the participants to indications of participants' speech and/or emotions as recognized by the system 1410.

In embodiments that use speaker-dependent voice and speech recognition techniques, the system 1410 may create and maintain data sets for individual participants that may be used in recognizing voices, emotions, and speech (e.g., words or phrases) for the individuals. In some embodiments, a participant's data set may be initially trained by the participant by speaking words and phrases, exhibiting different emotions, and providing feedback so that the system 1410 can analyze how the participant talks and establish baselines for the participants. As the participant uses the system 1410 over time, the additional samples of the participant's speech and emotions may be used to improve or refine the data set. Further, the participant may provide additional feedback to improve the quality of the voice, emotion, and speech recognition. For example, the system 1410 may visually indicate a participant's spoken words and/or emotions as recognized by the system 1410 and ask the participant if its interpretations of the participant's audio inputs are correct. The participant may respond, and the response may be used to improve the participant's data set.

FIG. 15 is a block diagram that illustrates processing participant audio according to audio analysis data in an audio analysis system, according to at least some embodiments. The audio analysis system 1510 may, for example, be implemented in an online game system as illustrated in FIGS. 1 through 3 or in a game spectating system as illustrated in FIGS. 4 through 10. Audio analysis system 1510 may receive participant audio signals (e.g., player, broadcaster, spectator, and/or commentator audio signals) from client devices 1520. Client devices 1520 may include player, broadcaster, spectator, and/or commentator devices as illustrated in FIGS. 1 through 11. A participant-specific analysis component 1524 may analyze the individual participants' audio signals according to participant audio analysis data 1526 to generate participant information. Participant audio analysis data 1526 may, for example, include participant-specific emotion and/or speech patterns that can be matched to voice and/or speech metrics extracted from the participants' audio signals to, for example, determine emotional states (e.g., excitement, stress, fear, shock, surprise, amusement, etc.) for the individual participants, or recognize keywords or word patterns spoken by the participants.

A group analysis component 1512 may receive participant information output by the participant analysis component 1524. The group analysis component 1512 may normalize and aggregate the participant information, and analyze the aggregated information according to group audio analysis data 1514 to generate group/crowd information. Group audio analysis data 1514 may, for example, include emotion and/or speech patterns that can be matched to aggregated emotion and/or speech metrics to, for example, determine states (e.g., excitement, stress, fear, shock, surprise, amusement, etc.) at the group or crowd level.

A game-specific analysis component 1516 may receive participant information output by the participant analysis component 1524 and/or group/crowd information output by the group analysis component 1512. The game-specific analysis component 1516 may, for example, map the group and/or participant emotion and/or speech information to game-specific events according to game-specific audio analysis data 1518 to generate game event information. Game-specific audio analysis data 1518 may, for example, include emotion and/or speech patterns that are matched or mapped to particular game events.

The audio analysis system may output participant information, group/crowd information, and/or game event information to one or more game or spectating systems 1500. The participant information may include, but is not limited to, indications of emotional states for the individual participants and words or phrases spoken by the participants as detected by participant analysis 1524. Group/crowd information may include, but is not limited to, indications of states (e.g., excitement, stress, fear, shock, surprise, amusement, etc.) at the group or crowd level as determined by group analysis 1512. Game event information may include, but is not limited to, indications of particular game events as determined by the game-specific analysis 1516. The information may, for example, be provided to an online game system as illustrated in FIGS. 1 through 3 or to a game system in a game spectating system as illustrated in FIGS. 4 through 10. The online game system may then use the provided information to affect game play, for example as described in reference to element 204 of FIG. 2. Instead or in addition, the current information may be provided to a game spectating system in a game spectating system as illustrated in FIGS. 4 through 10. The game spectating system may then use the provided information to affect the game spectating system, for example as described in reference to element 504 of FIG. 5.

In some embodiments, the audio analysis system 1510 may use feedback and machine learning techniques as described above in reference to FIG. 14 to train and improve the data sets used in participant analysis 1524, group analysis 1512, and/or game-specific analysis 1516.

FIG. 16 is a block diagram that illustrates analysis of audio performed at least in part on client devices in an online gaming environment, according to at least some embodiments. An online gaming environment may include a game or spectating system 1800, an audio analysis system 1810, and client devices 1820. Client devices 1820 may include player, broadcaster, spectator, and/or commentator devices as illustrated in FIGS. 1 through 13. Audio analysis system 1810 may implement an audio analysis engine 1812 and an API 1814 to the audio analysis functionality. Audio analysis system 1810 may also store audio analysis information (shown as audio analysis database 1818) for groups, crowds, and/or games including but not limited to audio content patterns that can be matched or mapped to group or crowd states, particular game events, and so on.

In some embodiments, client devices 1820 may include client 1822 software for receiving and processing A/V input and for communicating with game or spectating system 1800 to participate in or spectate games. In some embodiments, an audio analysis client module 1824 may be installed on at least some client devices 1820. In some embodiments, participant audio analysis data 1826 may be stored locally on client devices 1820. Participant audio analysis data 1826 may, for example, include learned audio patterns corresponding to the individual participant's voice and states (e.g., emotional states). The audio analysis client module 1824 may locally perform audio analysis for a participant (player or spectator) associated with the client device 1820 according to participant audio analysis data 1826 specific to the participant. Performing audio analysis for a participant may, for example, include matching or mapping the participant's audio signal to the participant's audio patterns maintained in participant audio analysis data 1826. Audio analysis client module 1824 may stream or upload the participant audio analysis information to audio analysis system 1810 via API 1814 for aggregation and analysis with other audio information.

At the audio analysis system 1810, audio analysis engine 1812 may normalize and aggregate participant audio analysis information from multiple participants and perform analysis of the aggregated information according to audio analysis data stored in audio analysis database 1818 to generate audio analysis information. The audio analysis information may include audio analysis data for groups, crowds, and/or games including but not limited to audio patterns that can be matched or mapped to group or crowd states, particular game events, and so on. The audio analysis information may be provided to the game or spectating system 1800. The audio analysis information may, for example, be provided to an online game system as illustrated in FIGS. 1 through 3 or to a game system in a game spectating system as illustrated in FIGS. 4 through 10. The game system may then use the audio analysis information to affect game play, for example as described in reference to element 204 of FIG. 2. Instead or in addition, the audio analysis information may be provided to a game spectating system in a game spectating system as illustrated in FIGS. 4 through 10. The game spectating system may then use the audio analysis information to affect the game spectating system, for example as described in reference to element 504 of FIG. 5.

Example Online Gaming Network Environments

FIG. 17 illustrates an example network-based game and game spectating environment, according to at least some embodiments. Embodiments of game systems, spectating systems, and/or audio analysis systems that implement the methods and apparatus for analyzing and applying audio input from participants in online gaming environments as described herein in reference to FIGS. 1 through 16 may be implemented in the context of a service provider that provides virtualized resources (e.g., virtualized computing resources, virtualized storage resources, virtualized database (DB) resources, etc.) on a provider network 1990 to clients of the service provider, for example as illustrated in FIG. 17. Virtualized resource instances may be provisioned via one or more provider network services 1992, and may be rented or leased to the clients of the service provider, for example to developer 1970 clients that develop and provide game systems 1900 or other systems or services via the provider network 1990 and services 1992.

In at least some embodiments, one or more developers 1970 may access one or more of services 1992 of the provider network 1990 via application programming interfaces (APIs) to the services 1992 to configure a game system 1900, audio analysis service 1910, and/or game spectating service 1930 on the provider network 1990. A game system 1900, audio analysis service 1910, or game spectating service 1930 may include multiple virtualized resource instances (e.g., computing resources, storage resources, DB resources, etc.).

At least some of the resource instances on the provider network 1990 (e.g., computing resources) may be implemented according to hardware virtualization technology that enables multiple operating systems to run concurrently on a host computer, i.e. as virtual machines (VMs) on the host. The provider network 1990, via the services 1992, may enable the provisioning of logically isolated sections of the provider network 1990 to particular clients as client private networks on the provider network 1990. At least some of a client's resources instances on the provider network 1990 may be provisioned in the client's private network. For example, in FIG. 17, one or more game systems 1900 may be implemented as or in private networks of respective developers 1970 that are provisioned on provider network 1990 via one or more of the services 1992. As another example, an audio analysis service 1910, and/or game spectating service 1930 may be provisioned in private networks on provider network 1990 via one or more of the services 1992.

The provider network 1990, via the services 1992, may provide flexible provisioning of resource instances to clients in which virtualized resource instances can be automatically added to or removed from a configuration on the provider network 1990 in response to changes in demand or usage, thus enabling an implementation on the provider network 1990 to automatically scale to handle computation and/or storage needs. For example, one or more additional computing and/or storage resources may be automatically added to a game system 1900, to audio analysis service 1910, and/or to game spectating service 1930 in response to an increase in game playing, broadcasting, and/or game spectating from broadcaster/player devices 1920 and/or spectator devices 1980. Conversely, if and when usage drops below a threshold, resources can be removed from a game system 1900, audio analysis service 1910, and/or game spectating service 1930.

Illustrative System

In at least some embodiments, a computing device that implements a portion or all of the methods and apparatus for analyzing and applying audio input from participants in online gaming environments as described herein may include a general-purpose computer system that includes or is configured to access one or more computer-accessible media, such as computer system 2000 illustrated in FIG. 18. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for analyzing and applying audio input from participants in online gaming environments, are shown stored within system memory 2020 as code 2025 and data 2026.

In one embodiment, I/O interface 2030 may be configured to coordinate I/O traffic between processor 2010, system memory 2020, and any peripheral devices in the device 2000, including network interface 2040, input/output (I/O) devices, or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, I/O interface 2030 may support one or more input/output peripheral devices or components 2070 of system 2000, such as cursor control, keyboard, display, video, and/or audio I/O devices 2070 or components. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into at least one processor 2010.

Network interface 2040 may be configured to allow data to be exchanged between computer system 2000 and other devices 2060 attached to a network or networks 2050, such as other computer systems or devices as illustrated in FIGS. 1 through 17, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 17 for implementing embodiments of methods and apparatus for analyzing and applying audio input from participants in online gaming environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more computing devices configured to implement a game spectating system configured to:
        receive spectator audio input for a plurality of spectators associated with a plurality of spectator devices receiving a video broadcasted from a broadcaster device via the game spectating system;
        analyze the spectator audio input to generate audio analysis information, wherein the audio analysis information indicates that the plurality of spectators are respectively associated with a particular group of a plurality of groups; and
        send, to the game spectating system, one or more indications of the group as metadata for the plurality of spectators to affect the video.

2. The system of claim 1, wherein the game spectating system is further configured to:
    determine that at least one spectator of the plurality of spectators is associated with the particular group based at least in part on detection of particular keywords in the spectator audio input.

3. The system of claim 1, wherein the game spectating system is further configured to:
    map a portion of the spectator audio input to an event that occurred in the video;
    determine that the event correlates to the particular group; and
    associate at least one spectator of the plurality of spectators with the particular group based at least in part on a determination that the portion of the spectator audio input is mapped to the event correlated to the particular group.

4. The system of claim 3, wherein the game spectating system is further configured to:
    correlate an audio pattern of the portion of the spectator audio input with an event type of the event;
    receive additional spectator audio input for the plurality of spectators;
    determine whether an additional audio pattern of the additional spectator audio input is similar to the audio pattern; and
    based at least in part on a determination that the additional audio pattern is similar to the audio pattern, determine that an upcoming event is of the event type.

5. The system of claim 1, wherein the game spectating system is further configured to:
    generate profile information indicating respective associations of the plurality of spectators with the plurality of groups; and
    store the profile information to the game spectating system.

6. The system of claim 1, wherein the game spectating system is further configured to:
    determine one or more other spectator devices associated with the particular group; and
    broadcast spectator audio output, generated based at least in part on the spectator audio input, to one or more other spectator devices associated with the particular group, wherein the spectator audio input is not broadcast to spectator devices associated with another group of the plurality of groups.

7. The system of claim 6, wherein the game spectating system is further configured to:
    generate the spectator audio output by selecting one or more pre-recorded sound tracks based at least in part on the audio analysis information.

8. A method, comprising:
    performing, by an audio analysis module implemented on one or more computing devices:
        receiving spectator audio input for a plurality of spectators associated with a plurality of spectator devices receiving a video broadcasted from a broadcaster device via a game spectating system;
        analyzing the spectator audio input to generate audio analysis information, wherein the audio analysis information indicates that the plurality of spectators are respectively associated with a particular group of a plurality of groups; and
        sending, to the game spectating system, one or more indications of the group as metadata for the plurality of spectators to affect the video.

9. The method of claim 8, further comprising:
determining that at least one spectator of the plurality of spectators is associated with the particular group based at least in part on detection of particular keywords in the spectator audio input.

10. The method of claim 8, further comprising:
mapping a portion of the spectator audio input to an event that occurred in the video;
determining that the event correlates to the particular group; and
associating at least one spectator of the plurality of spectators with the particular group based at least in part on a determination that the portion of the spectator audio input is mapped to the event correlated to the particular group.

11. The method of claim 10, further comprising:
correlating an audio pattern of the portion of the spectator audio input with an event type of the event;
receiving additional spectator audio input for the plurality of spectators;
determining whether an additional audio pattern of the additional spectator audio input is similar to the audio pattern; and
based at least in part on a determination that the additional audio pattern is similar to the audio pattern, determining that an upcoming event is of the event type.

12. The method of claim 8, further comprising:
generating profile information indicating respective associations of the plurality of spectators with the plurality of groups; and
storing the profile information to the game spectating system.

13. The method of claim 8, further comprising:
determining one or more other spectator devices associated with the particular group; and
broadcasting spectator audio output, generated based at least in part on the spectator audio input, to one or more other spectator devices associated with the particular group, wherein the spectator audio input is not broadcast to spectator devices associated with another group of the plurality of groups.

14. The method of claim 13, further comprising:
generating the spectator audio output by selecting one or more pre-recorded sound tracks based at least in part on the audio analysis information.

15. One or more non-transitory, computer-readable storage media comprising instructions that, when executed on or across one or more processors, cause the one or more processors to:
receive spectator audio input for a plurality of spectators associated with a plurality of spectator devices receiving a video broadcasted from a broadcaster device via a game spectating system;
analyze the spectator audio input to generate audio analysis information, wherein the audio analysis information indicates that the plurality of spectators are respectively associated with a particular group of a plurality of groups; and
send, to the game spectating system, one or more indications of the group as metadata for the plurality of spectators to affect the video.

16. The one or more non-transitory, computer-readable storage media of claim 15, further comprising instructions that, when executed on or across the one or more processors, cause the one or more processors to:
determine that at least one spectator of the plurality of spectators is associated with the particular group based at least in part on detection of particular keywords in the spectator audio input.

17. The one or more non-transitory, computer-readable storage media of claim 15, further comprising instructions that, when executed on or across the one or more processors, cause the one or more processors to:
map a portion of the spectator audio input to an event that occurred in the video;
determine that the event correlates to the particular group; and
associate at least one spectator of the plurality of spectators with the particular group based at least in part on a determination that the portion of the spectator audio input is mapped to the event correlated to the particular group.

18. The one or more non-transitory, computer-readable storage media of claim 17, further comprising instructions that, when executed on or across the one or more processors, cause the one or more processors to:
correlate an audio pattern of the portion of the spectator audio input with an event type of the event;
receive additional spectator audio input for the plurality of spectators;
determine whether an additional audio pattern of the additional spectator audio input is similar to the audio pattern; and
based at least in part on a determination that the additional audio pattern is similar to the audio pattern, determine that an upcoming event is of the event type.

19. The one or more non-transitory, computer-readable storage media of claim 15, further comprising instructions that, when executed on or across the one or more processors, cause the one or more processors to:
generate profile information indicating respective associations of the plurality of spectators with the plurality of groups; and
store the profile information to the game spectating system.

20. The one or more non-transitory, computer-readable storage media of claim 15, further comprising instructions that, when executed on or across the one or more processors, cause the one or more processors to:
determine one or more other spectator devices associated with the particular group; and
broadcast spectator audio output, generated based at least in part on the spectator audio input, to one or more other spectator devices associated with the particular group, wherein the spectator audio input is not broadcast to spectator devices associated with another group of the plurality of groups.

\* \* \* \* \*